(12) United States Patent
Aamodt et al.

(10) Patent No.: US 11,148,560 B1
(45) Date of Patent: Oct. 19, 2021

(54) BICYCLE TRAILER SEAT RECLINE

(71) Applicant: Burley Design LLC, Eugene, OR (US)

(72) Inventors: Evan Aamodt, Philadelphia, PA (US); Mike Dotsey, Chester Springs, PA (US); Lindsay Malatesta, Lansdale, PA (US); Andrew J. Miller, Phoenixville, PA (US); Erin H. Morrissey, Mont Claire, PA (US); Scott Spence, Eugene, OR (US); Jonathan Anderegg, Eugene, OR (US); Matthew Downing, Eugene, OR (US)

(73) Assignee: Burley Design LLC, Eugene, OR (US)

( * ) Notice: Subject to any disclaimer, the term of this patent is extended or adjusted under 35 U.S.C. 154(b) by 324 days.

(21) Appl. No.: 16/392,428

(22) Filed: Apr. 23, 2019

Related U.S. Application Data

(60) Provisional application No. 62/694,400, filed on Jul. 5, 2018.

(51) Int. Cl.
*B62K 27/00* (2006.01)
*B62B 9/10* (2006.01)
*B60N 2/235* (2006.01)
*B60N 2/22* (2006.01)

(52) U.S. Cl.
CPC ......... *B60N 2/2352* (2013.01); *B60N 2/2245* (2013.01); *B62K 27/003* (2013.01); *B62B 9/104* (2013.01)

(58) Field of Classification Search
CPC ........ B62B 9/104; B62K 27/003; B60N 23/52
See application file for complete search history.

(56) References Cited

U.S. PATENT DOCUMENTS

| 5,020,814 | A | * | 6/1991 | George | B62K 27/12 280/204 |
| 5,687,980 | A | * | 11/1997 | Eckroth | B62K 27/16 280/204 |
| 5,785,333 | A | * | 7/1998 | Hinkston | B62K 27/003 280/204 |

(Continued)

OTHER PUBLICATIONS

Photographs of Hamax seat design that a representative of the Applicant first saw at a trade show in Germany during the summer of 2018, but after Jul. 5, 2018. These photographs were obtained in Nov. 2018; 1 page.

(Continued)

*Primary Examiner* — Katy M Ebner
(74) *Attorney, Agent, or Firm* — Klarquist Sparkman, LLP

(57) ABSTRACT

A bicycle seat recline adjusts the incline of a bicycle trailer seat back. The seat recline can comprise opposed gear racks engaged by gears at opposite ends of a cross member. The cross member is coupled to an upper portion of the seat back. Moving the cross member moves the gears in the gear racks and adjusts the angle of the seat back. The cross member is desirably selectively and simultaneously lockable to and releasable from any one of a plurality of positions along the gear rack. A lower portion of the seat back can pivot about a lower pivot axis. The gear racks can be arced to maintain a constant distance to the lower pivot axis as the cross member is moved and maintains a constant tension on the seat back. A plurality of seats with adjustable seat back reclines can be included in the bicycle trailer.

20 Claims, 12 Drawing Sheets

(56) References Cited

U.S. PATENT DOCUMENTS

| | | | | |
|---|---|---|---|---|
| 5,979,921 | A * | 11/1999 | Derven | B62K 15/006 |
| | | | | 280/204 |
| 7,387,310 | B1 * | 6/2008 | Liu | B62B 7/10 |
| | | | | 280/47.38 |
| 7,431,324 | B2 * | 10/2008 | Britton | B60N 2/2806 |
| | | | | 280/47.38 |
| 7,690,675 | B2 * | 4/2010 | Britton | B62K 27/04 |
| | | | | 280/658 |
| 8,979,116 | B1 * | 3/2015 | Liu | B62K 27/003 |
| | | | | 280/656 |
| 9,908,552 | B2 * | 3/2018 | Fleming | B62B 7/10 |
| 10,328,965 | B2 * | 6/2019 | Britton | B62B 9/104 |
| 2011/0175306 | A1 * | 7/2011 | Newhard | B62B 9/104 |
| | | | | 280/47.4 |
| 2017/0361861 | A1 | 12/2017 | Britton et al. | |

OTHER PUBLICATIONS

Sketch and description of Hamax seat design with curved recline tracks with teeth therein that was prepared by the representative of the Applicant who saw the Hamax seat design (based on his memory of what he saw) at the trade show in Germany during the summer of 2018, but after Jul. 5, 2018; 1 page.
U.S. Appl. No. 62/084,992, filed Nov. 26, 2014.

* cited by examiner

BICYCLE TRAILER SEAT RECLINE

CROSS REFERENCE TO RELATED APPLICATION

This application claims the benefit of U.S. Provisional Application Ser. No. 62/694,400, entitled BICYCLE TRAILER SEAT RECLINE, filed on Jul. 5, 2018, which is incorporated by reference herein.

FIELD

This disclosure relates to bicycle trailers with seat reclining mechanisms and to seat reclining mechanisms for bicycle trailers.

BACKGROUND

It is desirable to adjust the angle of the seat in a bicycle trailer to better fit a child or other user sitting on the seat.

SUMMARY

In accordance with an aspect of an embodiment of this disclosure, a seat reclining mechanism for a bicycle trailer comprises a reclining mechanism which is operable to adjust the incline of a seat back of a seat of the bicycle trailer. The seat recline mechanism desirably comprises first and second opposed gear racks with a cross member. The cross member supports respective gears in a position to engage the gear racks and also supports an upper portion of the seat. Moving the cross member moves the along the respective gear racks and adjusts the angle of the seat back relative to the frame of the bicycle trailer and thereby adjusts the recline of the seat. The cross member desirably is selectively lockable to and from any one of a plurality of positions, such as at least three such positions, to which the cross member is moved. The respective end portions of the cross members can desirably be simultaneously locked and unlocked from the selected position. A movable actuator member can be used for locking and unlocking the cross member for movement. A lower portion of the seat back can be supported for pivoting movement about a pivot axis. In addition, the gear racks can be arced so as to maintain a constant distance to the lower pivot axis as the seat back is ace and a first wall extending between the first upper jaw portion and the first lower with respective seat back recline adjustment mechanisms can be included in the bicycle trailer.

In accordance with an embodiment, a bicycle trailer can comprise a frame defining a seating area and first and second spaced apart top frame members, the first and second top frame members being positioned at an elevation that is higher than the seating area. A bicycle seat recline mechanism of the bicycle trailer can comprise a first support comprising a first rack coupled to the first top frame member and a second support comprising a second rack coupled to the second top frame member, the first and second racks facing one another. In addition, a cross member can comprise first and second end portions, the first end portion being coupled to the first support and the second end portion being coupled to the second support. The cross member can be movable forwardly and rearwardly along the first and second supports between a plurality of positions. Also, a rod with first and second rod ends can comprise a component of the recline mechanism. The rod can be rotatably coupled to the cross member. Additionally, a first gear can be coupled to the first rod end in engagement with the first gear rack and a second gear can be coupled to the second rod end and positioned in engagement with the second gear rack. The first and second gears are desirably coupled to the respective rod ends for rotating together when the rod is rotated. Whereby, upon movement of the cross member from a first of the plurality of positions to another of the plurality of positions, the rod rotates and the first and second gears travel together along the respective first and second gear racks. In this embodiment, the bicycle trailer can comprise a seat comprising a seat back portion with an upper end portion coupled to the cross member; whereby upon movement of the cross member from a first of the plurality of positions to a second of the plurality of positions, the upper end portion of the seat moves in the direction of movement of the cross member and changes the inclination of the seat back portion of the seat. Also, a latch can be coupled to the cross member and movable into a first latching position engaging at least one of the first and second supports and coupling the cross member to said one of the first and second supports and movable to a second un-latched position disengaged from said one of said first and second supports, and wherein in the first latching position, the latch retains the cross member in a selected one of the plurality of positions.

As another aspect, the first support can comprise a first support inner wall, a first support top, a first support bottom, and a first support outer wall. In addition, the second support can comprise a second support inner wall facing the first support inner wall, a second support top surface, a second support bottom surface and a second support outer wall. Also, the first rack can be recessed into the first support inner wall and the second rack is recessed into the second support inner wall.

As a further aspect, a first support coupler can be mounted to the first end portion of the cross member and slidably coupled to the first support and a second support coupler can be mounted to the second end portion of the cross member and slidably coupled to the second support.

Also, the first support coupler can comprise a first coupler body coupled to the first end portion of the cross member and at least one first upper coupler projection that projects outwardly from the first coupler body and that is positioned to overhang and slide against the first support top surface. The first support coupler can also comprise a first flange portion spaced from the first coupler body and projecting downwardly from the first upper coupler projection, the first flange portion being positioned to slide against the first support outer wall. The first support coupler can also comprise at least one first lower coupler projection that projects outwardly from the first coupler body and that is positioned to underlie and slide against the first support bottom surface. Moreover, the first support coupler can comprise at least one first lower coupler projection comprising at least one second flange portion spaced from the first coupler body and projecting upwardly from the first lower coupler projection, the second flange portion being positioned to slide against the first support outer wall. In addition, the second support coupler can comprise a second coupler body coupled to the second end portion of the cross member and at least one second upper coupler projection that projects outwardly from the second coupler body and that is positioned to overhang and slide against the second support top surface. The second support coupler can also comprise a third flange portion spaced from the second coupler body and projecting downwardly from the second upper coupler projection, the third flange portion being positioned to slide against the second support outer wall. Moreover, the second support coupler can also comprise at least one second lower coupler projection that projects outwardly from the second coupler body and that is positioned to underlie and slide against the second support bottom surface. Also, the second support coupler can comprise at least one second lower coupler projection comprising at least one fourth flange portion spaced from the second coupler body and projecting upwardly from the second lower coupler projection, the second flange portion being positioned to slide against the second support outer wall.

As yet another aspect, the first support outer wall can comprise a first upper groove slidably engaged by the at least one first flange portion and a first lower groove slidably engaged by the at least one second flange portion. In addition, the second support outer wall can comprise a second upper groove slidably engaged by the at least one third flange portion and a second lower groove slidably engaged by the at least one fourth flange portion.

As another aspect, the first gear can be supported by the first rod end at a position outwardly from the first coupler body and at an elevation lower than the first upper coupler projection and at an elevation higher than the first lower coupler projection. Also, the second gear can be supported by the second rod end at a position outwardly from the second coupler body and at an elevation lower than the second upper coupler projection and at an elevation higher than the second lower coupler projection.

As a further aspect, there can be first and second of the first upper projections that are spaced apart from one another, each of the first and second of the first upper projections comprising a respective downwardly projecting first flange, and wherein there are first and second of the second upper projections that are spaced apart from one another, each of the first and second of the second upper projections comprising a respective downwardly projecting third flange.

As a still further aspect, the latch can comprise a first latching rod with a first actuator engaging end and a first locking end and a second latching rod with a second actuator engaging end and a second locking end, the first and second supports each comprising a respective locking end receiving opening at each of the plurality of positions. A latching rod actuator can be coupled to the first and second actuator engaging ends of the first and second latching rods, the latching rod actuator being operable to move the first locking end to the first latching position in which the first locking end is received in the locking end receiving opening of the first support at a selected one of the plurality of positions to retain the first end portion of the cross member at the selected one of the plurality of positions. Also, the latching rod actuator is desirably operable to move the second locking end to the first latching position in which the second locking end is received in the locking end receiving opening of the second support at the selected one of the plurality of positions to retain the second end portion of the cross member at the said one of the plurality of positions. In addition, the actuator can also be operable to move the first locking end to the second un-latched position out of the locking end receiving opening of the first support at said one of the plurality of locations and to move the second locking end to the second un-latched position out of the locking end receiving opening of the second support at said one of the plurality of locations; and whereby in the second un-latched positions, the cross member is movable to another of the selected plurality of positions.

As a further aspect, the latch can comprise a first latching rod with a first actuator engaging end and a first locking end and a second latching rod with an second actuator engaging end and a second locking end. Also, the first and second supports can each comprising a respective locking end receiving opening at each of the plurality of positions. In addition, a latching rod actuator coupled to the first and second actuator engaging ends of the first and second latching rods, the latching rod actuator can be operable to move the first locking end to the first latching position in which the first locking end is received in the locking end receiving opening of the first support at a selected one of the plurality of positions to retain the first end portion of the cross member at the selected one of the plurality of positions, the latching rod actuator being operable to move the second locking end to the first latching position in which the second locking end is received in the locking end receiving opening of the second support at the selected one of the plurality of positions to retain the second end portion of the cross member at the said one of the plurality of positions, the actuator also being operable to move the first locking end to the second un-latched position out of the locking end receiving opening of the first support at said one of the plurality of locations and to move the second locking end to the second un-latched positon out of the locking end receiving opening of the second support at said one of the plurality of locations, whereby in the second un-latched positions, the cross member is movable to another of the selected plurality of positions; and wherein the first and second locking ends can extend through the respective first and second coupler bodies at a location below the respective first and second gears when the first and second locking pins are in the first latching position.

As further aspects, the actuator can comprise an actuator housing coupled to the cross member at location between the first and second end portions of the cross member and extending downwardly from the cross member. The actuator can further comprise a sliding actuator member slidably coupled to the actuator housing for moving between first and second actuator member positions. Also, the actuator housing or the cross member can comprise first and second actuator slots, the first and second actuator slots being oriented to extend in a direction parallel to the cross member. The sliding actuator member can also comprise third and fourth actuator slots, the third actuator slot having an upper slot end portion aligned with a portion of the first actuator slot and a lower slot end portion positioned downwardly and inwardly from the upper slot end portion, the fourth actuator slot having an upper slot end portion aligned with a portion of the second actuator slot and a lower slot end portion positioned downwardly and inwardly from the upper slot end portion. Also, the first actuator engaging end of the first latching rod can comprise a first slot engaging portion passing through the first and third slots and the first actuator engaging end of the second latching rod can comprise a second slot engaging portion passing through the second and fourth slots. In accordance with this aspect, sliding the sliding actuator member relative to the housing in an upward direction simultaneously moves the first and second slot engaging portions and the first and second latching rods inwardly parallel to the cross member and moves the locking ends of the first and second latching rods to their unlatched position.

As yet another aspect, the bicycle trailer can have more than one seat, each with a respective seat recline mechanism with aspects as described above; and that can be identical. Thus, in addition to the aspects described previously, the bicycle trailer can further comprise a third top frame member spaced from the first and second top frame members and where the second top frame member is positioned between the first and third top frame members, the third top frame member being positioned at an elevation that is higher than the seating area. Also, the bicycle trailer can comprise a third support comprising a third rack coupled to the first top frame member and a fourth support comprising a fourth rack coupled to the third top frame member, the third and fourth racks facing one another. The recline mechanism for the second seat can comprise a second cross member comprising a first and second end portions, the first end portion of the second cross member being movably coupled to the third support and the second end portion of the second cross member being movably coupled to the fourth support, the second cross member being movable forwardly and rearwardly along the third and fourth supports between a plurality of positions. In addition, the second recline mechanism can also comprise a second rod with first and second rod ends, the second rod being rotatably coupled to the second cross member, a third gear coupled to the first rod end of the second rod in engagement with the third gear rack, and a fourth gear coupled to the second rod end of the second rod and positioned in engagement with the fourth gear rack. The third and fourth gears can be coupled to the respective rod ends of the second rod for rotating together when the second rod is rotated, whereby upon moving the second cross member from a first of the plurality of positions to another of the plurality of positions, the second rod rotates and the third and fourth gears travel together along the respective third and fourth gear racks. The second seat can comprise a second seat back portion and a second upper end portion, the second seat back portion being separated from the first seat back portion. As a result, upon moving the first cross member from a first of the plurality of positions to a second of the plurality of positions the first upper end portion of the first seat moves in the direction of movement of the first cross member and changes the inclination of the first seat back portion, and wherein upon moving the second cross member from a first of the plurality of positions to a second of the plurality of positions the second upper end portion of the second seat moves in the direction of movement of the second cross member and changes the inclination of the second seat back portion. In addition to a first latch associated with the first seat recline mechanism, a second latch can be associated with the second seat recline mechanism. That is, a second latch can be coupled to the second cross member and movable into a first latching position engaging at least one of the third and fourth supports and coupling the second cross member to said one of the third and fourth supports and movable to a second un-latched position disengaged from said one of said third and fourth supports, wherein in the first latching position, the second latch retains the second cross member in a selected one of the plurality of positions.

As a further aspect of a plural seat system, the first and second cross members can be movable relative to one another to independently adjust the inclination of the first and second upper seat portions. In addition, the first and second latches can be independently operable.

As yet another aspect, the first seat back portion can have a lower end that is pivotal about a transverse lower first seat back pivot axis, and the first and second racks can be arced to maintain a constant distance from the first rack to the lower first seat back pivot axis and from the second rack to the lower first seat pivot axis, whereby as the first cross member moves forwardly and rearwardly along the first and second supports, the distance between the first cross member and the lower first seat back pivot remains constant and thereby the tension on the first seat upper portion remains constant; and.

wherein the second seat back portion has a lower end that is pivotal about a transverse lower second seat back pivot axis, and wherein the third and fourth racks are arced to maintain a constant distance from the third rack to the lower second seat back pivot axis and from the fourth rack to the lower second seat pivot axis, whereby as the second cross member moves forwardly and rearwardly along the third and fourth supports, the distance between the second cross member and the lower second seat back pivot axis remains constant and thereby the tension on the second seat upper portion remains constant.

As a further aspect of a plural seat embodiment, the first and second top frame members, and the first and second supports can be arced to match the arc of the first and second rack. In addition, the second and third top frame members, and the second and third supports can be arced to match the arc of the third and fourth racks.

As yet another aspect, the upper seat portion has a lower end that is pivotal about a transverse lower seat back pivot axis, and wherein the first and second racks are concave when viewed from the lower seat back pivot axis.

As another aspect, the upper seat portion can have a lower end that is pivotal about a transverse lower seat back pivot axis, the first rack is arced to maintain a constant distance between the first rack and the lower seat back pivot axis, and the second rack can be arced to maintain a constant distance between the second rack and the lower seat back pivot axis, whereby as the cross member moves forwardly and rearwardly along the first and second supports, the distance between the cross member and the lower seat back pivot remains constant and thereby the tension on the upper seat portion remains constant. Also, in accordance with an aspect, the first and second top frame members, and the first and second supports can be arced to match the arc of the first and second racks.

In accordance with an embodiment, a bicycle trailer can comprise:

a frame defining a seating area, a bottom frame portion, a front frame portion comprising first and second upwardly extending front frame members, a rear frame portion comprising first and second upwardly extending rear frame members, and first and second spaced apart top frame members positioned higher than the seating area, the first and second top frame members being parallel to one another and extending forwardly of the rear frame portion;

a seat recline assembly coupled to first and second top frame members;

the seat recline assembly comprising a first support comprising a first support body, the first support body comprising a first support body interior side wall and a first support body exterior side wall, a first body rear end and a first body front end, a first body top surface and a first body bottom surface, wherein the first support body exterior side wall is coupled to the first top frame member and a first gear rack coupled to or formed as a part of the first body interior side wall, and the first gear rack extending in a direction from the first body rear end toward the first body front end;

the seat recline assembly comprising a second support comprising a second support body, the second support body comprising a second support body interior side wall and a second support body exterior side wall, a second body rear end and a second body front end, a second body top surface and a second body bottom surface, wherein the second support body exterior side wall is coupled to the second top frame member and a second gear rack is coupled or formed as a part of the second body interior side wall, the second gear rack extending in a direction from the second body rear end toward the second body front end, and wherein the second gear rack is parallel to the first gear rack;

a seat supporting cross member comprising first and second ends and extending longitudinally at least partially between the first and second top frame members; a first body engaging coupler mounted to the first end of the seat supporting cross member and a second body engaging coupler mounted to the second end of the seat supporting cross member;

the first body engaging coupler comprising a first upper jaw portion slidably engaging the first body top surface, a first lower jaw portion slidably engaging the first body bottom surface and a first wall extending between the first upper jaw portion and the first lower jaw portion;

the second body engaging coupler comprising a second upper jaw portion slidably engaging the second body top surface, a second lower jaw portion slidably engaging the second body bottom surface and a second wall extending between the second upper jaw portion and the second lower jaw portion;

a gear supporting rod extending through the seat supporting cross member and comprising first and second rod end portions, the gear supporting rod being rotatable relative to the seat supporting cross member, a first gear coupled to the first rod end portion and positioned between the first upper jaw portion and the first lower jaw portion and in engagement with the first gear rack, a second gear coupled to the second rod end portion and positioned between the second upper jaw portion and the second lower jaw portion and in engagement with the second gear rack, the first and second gears not being rotatable relative to the gear supporting rod, whereby the cross member is movable forwardly and rearwardly along the first and second supports between a plurality of positions with the first and second gears rotating together with the rotation of the gear supporting rod and in engagement with the respective first and second gear racks and with the first and second gears traveling respectively along the first and second gear racks without sliding as the cross member is moved between the plurality of positions;

a seat comprising a lower end portion coupled to the front trailer frame portion and an upper end portion coupled to the seat supporting cross member, whereby movement of the cross member between the plurality of positions moves the upper end portion of the seat in the direction of movement of the cross member and changes the inclination of the seat.

In accordance with another embodiment, a bicycle trailer can comprise:

a frame means for supporting a seat in a seating area;

first support means supported by the frame means and comprising a first gear receiving rack supported at a location at an elevation that is higher than the seating area;

second support means supported by the frame means and comprising a second gear receiving rack supported at a location at an elevation that is higher than the seating area, the first and second racks facing one another;

a cross member comprising a first and second end portions;

first gear means carried by the cross member for engaging and traveling along the first gear rack;

second gear means carried by the cross member for engaging and traveling along the second gear rack, the cross member being movable forwardly and rearwardly relative to the first and second supports between a plurality of positions with the first and second gear means traveling respectively along the first and second gear racks;

first coupling means for coupling the first end portion of the cross member to the first support and second coupling means for coupling the second end portion of the cross member to the second support;

a seat comprising an upper end portion coupled to the cross member, whereby upon moving the cross member from a first of the plurality of positions to a second of the plurality of positions the upper end portion of the seat moves in the direction of movement of the cross member and changes the inclination of the upper portion of the seat; and a latch means for selectively latching the cross member against movement from a selected one of the plurality of positions.

The invention encompasses all combinations and subcombinations of the aspect described above, in the disclosure below, and/or in the drawings that form a part of this application.

DETAILED DESCRIPTION

The following explanations of terms are provided to better describe the present disclosure and to guide those of ordinary skill in the art in the practice of the present disclosure. As used herein, the words "including" and "having" and their formatives (e.g. has, have, include, includes) have the same meaning as "comprising" and its corresponding formatives. Also, the singular forms "a" or "an" or "the" include plural references unless the context clearly dictates otherwise. The term "or" refers to a single element of stated alternative elements or a combination of two or more elements, unless the context clearly indicates otherwise. The term "coupled to" (e.g. element A is coupled to element B) includes direct connection of the elements and also includes indirect connection of the elements through one or more other elements. The terms "about" and "approximately" with respect to a value or stated range or orientation, unless otherwise stated, means plus or minus ten percent of the recited value, range or orientation.

Examples are described with reference to directions indicated as "above," "below," "upper," "lower", "top", "bottom", "ascending", "descending", and/or the like. These terms are used for convenient description, but do not imply or require any particular spatial orientation. For example, a support described as having a top surface and a bottom surface is typically oriented in use with the top surface facing upwardly and the bottom surface facing downwardly. If the orientation is changed such that the top surface faces forward, the support still has the same surface that is the top surface even though in a different orientation. The term "and/or" is to be broadly construed to include all possible combinations of elements or items with which the term is used, as well as the elements or items individually. The term "adjacent" means two components are positioned without other components being positioned between the adjacent portions of the two components.

Unless explained otherwise, all technical and scientific terms used herein have the same meaning as commonly understood to one of ordinary skill in the art to which this disclosure belongs. Although methods and materials similar or equivalent to those described herein, suitable methods and materials are described below. The materials, methods, and examples are illustrative only and not intended to be limiting, unless otherwise indicated. Other features of the disclosure will be apparent from the following detailed description.

Figure 1:
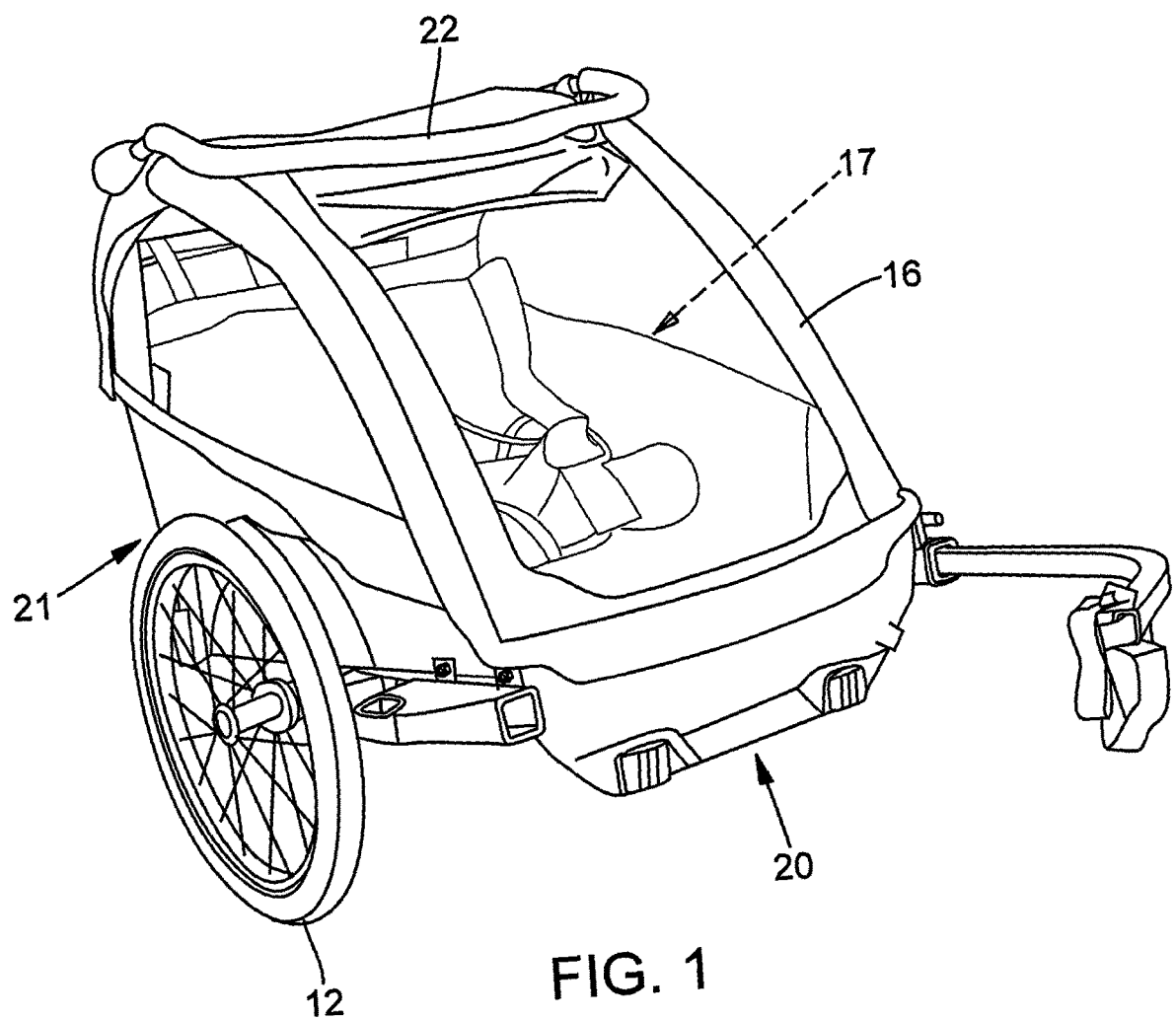
FIG. 1 is perspective views of an embodiment of a bicycle trailer with a seat recline in accordance with embodiments disclosed herein.
Figure 2:
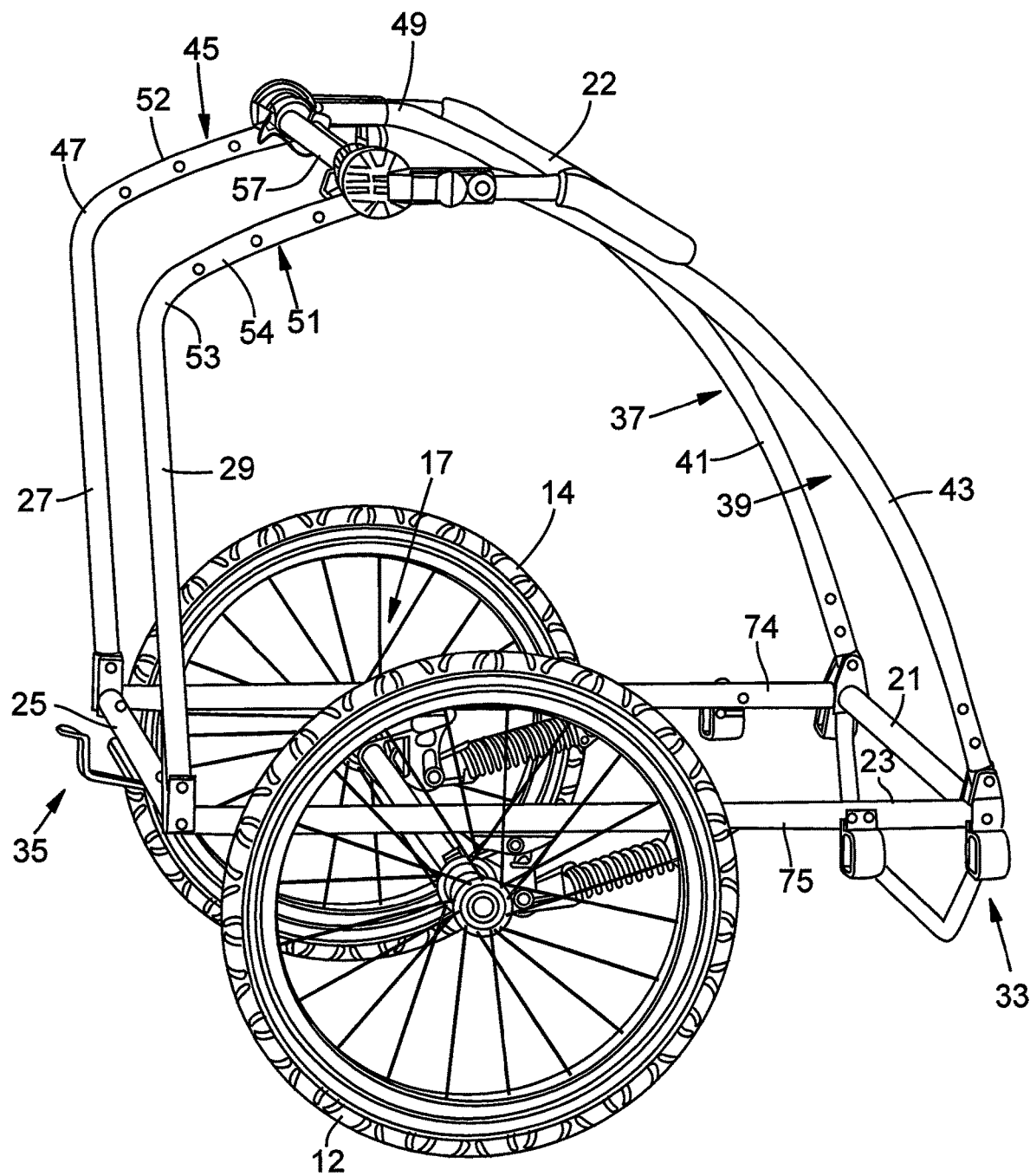
FIG. 2 is a perspective view of an exemplary trailer frame with wheels attached thereto that can be used in connection with a seat recline embodiment.

FIG. 1 illustrates an exemplary bicycle trailer 10. FIG. 2 illustrates an exemplary bicycle trailer frame.

With reference to these FIGS. 1 and 2, the bicycle trailer has first and second wheels 12, 14 and a frame 11 onto which a trailer covering 16 is mounted. A seat is provided in a seating area 17 within the interior of the trailer. The seat has one or more upwardly extending seat back portions that can be reclined to different positions using reclines in accordance with the present disclosure. The trailer comprises a trailer front 20 and a trailer rear 21.

With reference to FIG. 2, an exemplary frame 11 comprises front and rear frame portions 33, 35 and first and second side frame portions 37, 39. The side frame portions comprise first and second lower side frame members 74, 75 on opposite sides of the trailer frame. In FIG. 2, the side frame members 74, 75 extend from the front frame portion 33 to the rear frame portion 35 of the trailer. The illustrated front frame portion 33 comprises upper and lower cross member portions 21, 23 extending between the side frame members 74, 75. The illustrated rear frame portion includes a rear frame cross member 25 extending between the side frame members 74, 75 and first and second upright rear frame members 27, 29. The frame members 27, 29 can alternatively be considered as portions of the trailer side frame portions 37, 39. The side frame portion 37 comprises an upwardly and rearwardly extending first side frame member 41 and the side frame portion 39 includes an upwardly and rearwardly extending second side frame member 33. A top frame portion 45 interconnects rear frame member 27 and side frame member 41 at respective locations 47, 49. Another top frame portion 51 interconnects the rear frame member 29 and the side frame member 43. A top cross frame member 57 extends between the frame members 45 and 51. The top frame portions are at an elevation that is higher than the seat area. In the embodiment of FIG. 2, a rear top frame member portion 52 of top frame member 45 angles upwardly from location 42 to the top cross frame member 57. Also, in this embodiment, a rear top frame member portion 54 of top frame member 51 angles upwardly from location 53 to the top cross frame member 57.

Figure 3:
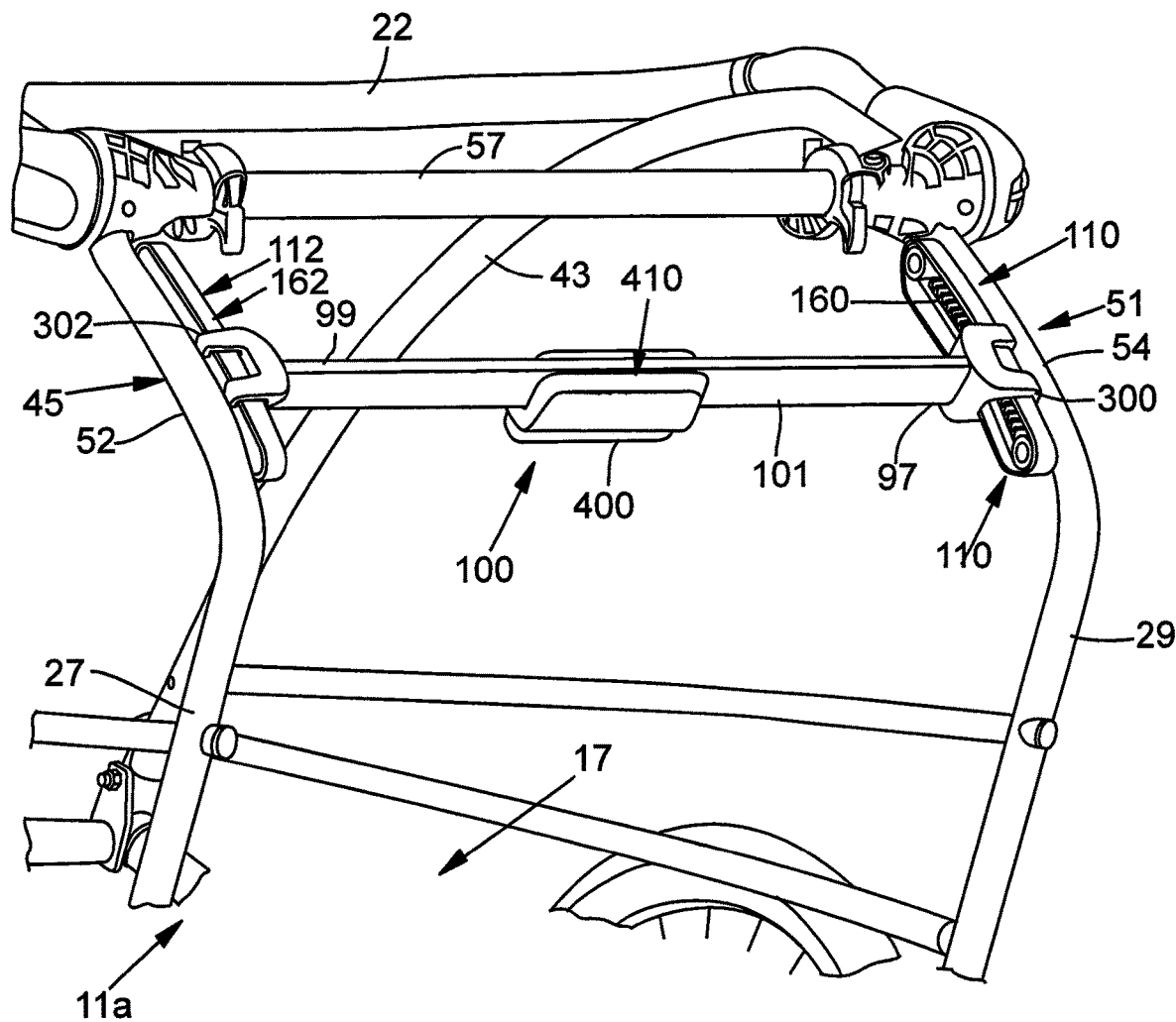
FIG. 3 is a view of a portion of one form of a trailer frame with an embodiment of a seat recline coupled to first and second top frame member of the frame.
Figure 4:
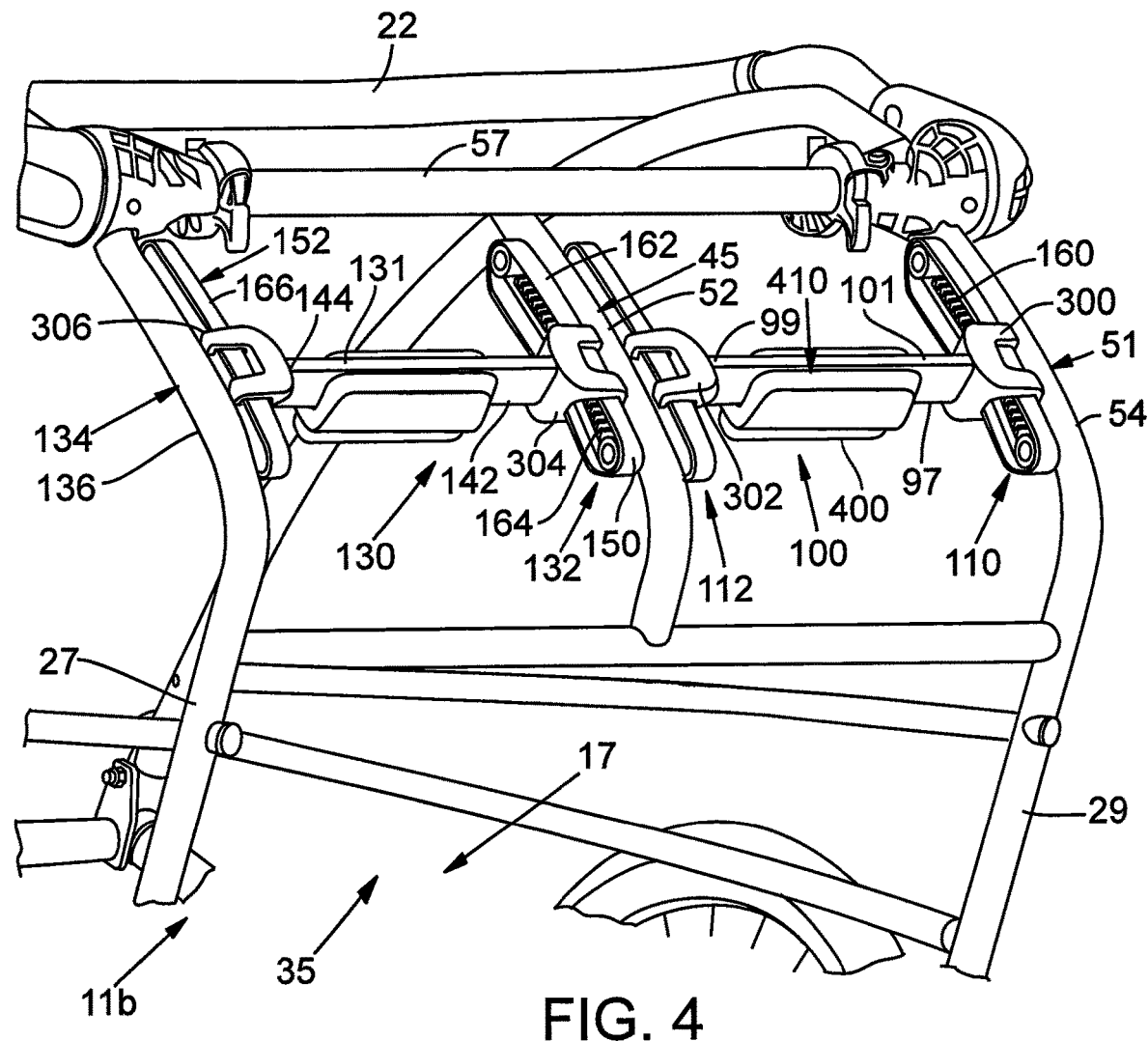
FIG. 4 is a view of a portion of a second form of a trailer frame two seat reclines coupled to top frame members.
Figure 5:
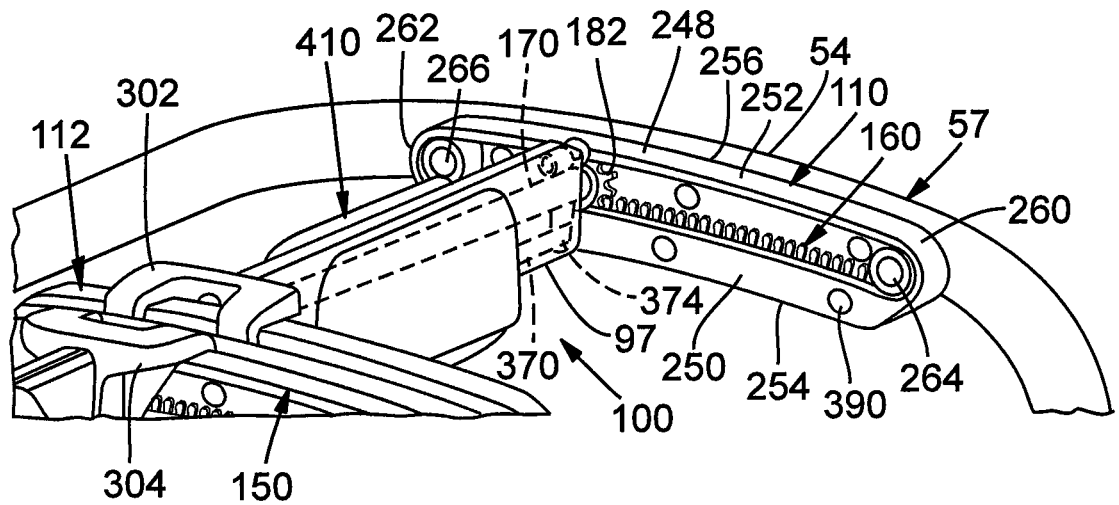
FIG. 5 is a partially broken away side perspective view of a seat recline showing an embodiment of a support coupled to one of the top frame members in greater detail.

It is to be understood that the frame can have additional or fewer frame members than those shown in FIG. 2. For example, portions of alternative trailer frame constructions are shown in FIGS. 3 and 4.

The frame can comprise any suitable durable material, such as aluminum tubing bent and coupled together by couplings or welded together, fiber reinforced polymer or composite materials, steel (although this is less desirable due to its weight), and/or titanium.

The trailer of FIG. 1 also includes a handle 22 that can be raised in the event the trailer is disconnected from a bicycle and pushed by a user, such when the trailer is used for jogging or as a stroller. It is to be understood that the term bicycle trailer refers to a trailer that in one mode can be towed by a bicycle but in other modes can be used in other manners, such as for jogging or as a stroller, with a child or children (or cargo) positioned on a seat within the interior of the trailer.

In FIG. 1, an exemplary accessory supporting arm 24 is inserted into an accessory arm receiving opening of a mount 26 to couple the accessory supporting arm 24 to the bicycle trailer frame. One or more latching pins can be used to retain the accessory supporting arm connected to the mount. Mounts can be provided along both sides of the trailer, such as one being coupled to each of the first and second side frame members 74, 75.

The illustrated arm 24 in FIG. 1 has a trailer hitch 30 as an accessory coupled thereto. The hitch can be a conventional hitch for coupling to the rear axle of a bicycle or to other bicycle components depending upon the nature of the hitch. The accessory supporting arms can be of different shapes and dimensions. For example, if the accessory is a wheel, a shorter support arm can be used and one such arm can be placed in each of the mounts at the sides of the trailer to provide a wheel at each side of the trailer. Other accessories can also be mounted in the alternative, such as a single wheel coupled to two accessory support arms, each of such arms being received by a respective one of the mounts.

With reference to FIGS. 3 and 4, the illustrated frame 11a is shown in FIG. 3 with a recline 100 comprising a cross member 101 having respective first and second cross member end portions 97, 99. The first cross member end portion 97 is coupled to a first support 110 and the second cross member end portion 99 is coupled to a second support 112. The first support 110 is coupled, such as by bolts, screws or other fasteners, to top frame portion 51, which can be considered as a first top frame member, and more particularly in this example to the rear portion 54 of the top frame member. The second support 112 is coupled, such as by bolts, screws or other fasteners, to top frame portion 45, which can be considered as a second top frame member, and more particularly in this example to the rear portion 52 of the top frame member. The seating area 17 is indicated in FIG. 3. Therefore, in this example, first and second top frame members 51, 45 are positioned at an elevation that is higher than the seating area.

In the embodiment of FIG. 4, the trailer frame 11b supports first and second reclines 100, 130. The first recline 100 can be coupled to a first seat upper portion and the second recline 130 can be coupled to a second seat upper portion. As explained below, the first recline 100 can be used to adjust the inclination of the first seat upper portion to adjust the recline of the first upper seat portion; and the second recline can be used to adjust the inclination of the second seat upper portion to adjust the recline of the second upper seat portion. The reclines of the first and second upper seat portions can desirably be independently adjusted.

In FIG. 4, the rear frame portion 35 comprises an upper rear frame cross member 132 extending between upper end portions of the rear frame members 27, 29. The second top frame member 52 extends from rear frame cross member 132 upwardly and forwardly to the top frame cross member 57. In this example, a third top frame portion 134 extends from the upper end portion of rear frame member 27 to the top frame cross member 57. Third top frame portion 134 can be considered a third top frame member with a rear portion 136 thereof angling upwardly from the rear frame member 27. Thus in FIG. 4, the second top frame member 45 is positioned between the first top frame member 51 and the third top frame member 134. More specifically, in a desirable example, the second top frame member 45 can be midway between the first and third top frame members 51, 134.

The second recline 130 comprises a second cross member 131 having respective first and second cross member end portions 142, 144. The first cross member end portion 142 can be coupled to a third support 150 and the second cross member end portion 144 can be coupled to a fourth support 152. The third support 150 can be coupled, such as by bolts, screws or other fasteners, to the top frame portion 45, which again can comprise a second top frame member and more particularly in this example to the rear portion 52 of the second top frame member. The fourth support 152 can be coupled, such as by bolts, screws or other fasteners, to top frame portion 134, which again can comprise the third top frame member, and more particularly in this example to the rear portion 136 of this third top frame member. The seating area 17 is indicated in FIG. 4. Therefore, in this example, first, second and third top frame members 51, 45 and 134 are positioned at an elevation that is higher than the seating area.

The respective supports can be, but are not required to be, identical to one another. Alternatively, the second and third supports can be a combined unit that bridges the top frame member 52.

With further reference to FIGS. 3 and 4, the first support 110 comprises a first rack 160 comprising a gear engaging rack coupled to the first top frame member 51 as a result of the coupling of the first support 110 to the first frame member. In addition, the second support 112 comprises a second rack 162 comprising a gear engaging rack coupled to the second top frame member 45 as a result of the coupling of the second support 112 to the second frame member. The first and second supports have a length and a longitudinal axis and the first and second racks 160, 162 desirably extend in a lengthwise direction along the respective first and second supports 110, 112, such as longitudinally there along. The first and second racks 160, 162 are supported in a position to face one another and desirably are parallel to one another. Referring to FIG. 4, the third support 150 comprises a third rack 164 comprising a gear engaging rack coupled to the second top frame member 45 as a result of the coupling of the third support 150 to the first frame member. In addition, the fourth support 152 comprises a fourth rack 166 comprising a gear engaging rack coupled to the third top frame member 134 as a result of the coupling of the fourth support 152 to the third frame member. The third and fourth supports have a length and a longitudinal axis and the third and fourth racks desirably extend in a lengthwise direction along the respective third and fourth supports, such as longitudinally there along. The third and first and second racks 160, 162 are supported in a position to face one another and desirably are parallel to one another.

The cross member 101 in FIG. 3 and first and second cross members 101, 131 in FIG. 4 are movable forwardly and rearwardly relative to the first and second supports between a plurality of positions. The cross member 101 and cross members 101, 131 each comprise first and second ends. Desirably the first cross member 101 extends transversely at least partially between the first and second top frame members and the cross member 131 desirably extends transversely at least partially between the second and third second top frame members.

The reclines 100, 130 can be the same. Therefore, the description below proceeds with reference to recline 100 and FIGS. 5-11.

Figure 8:
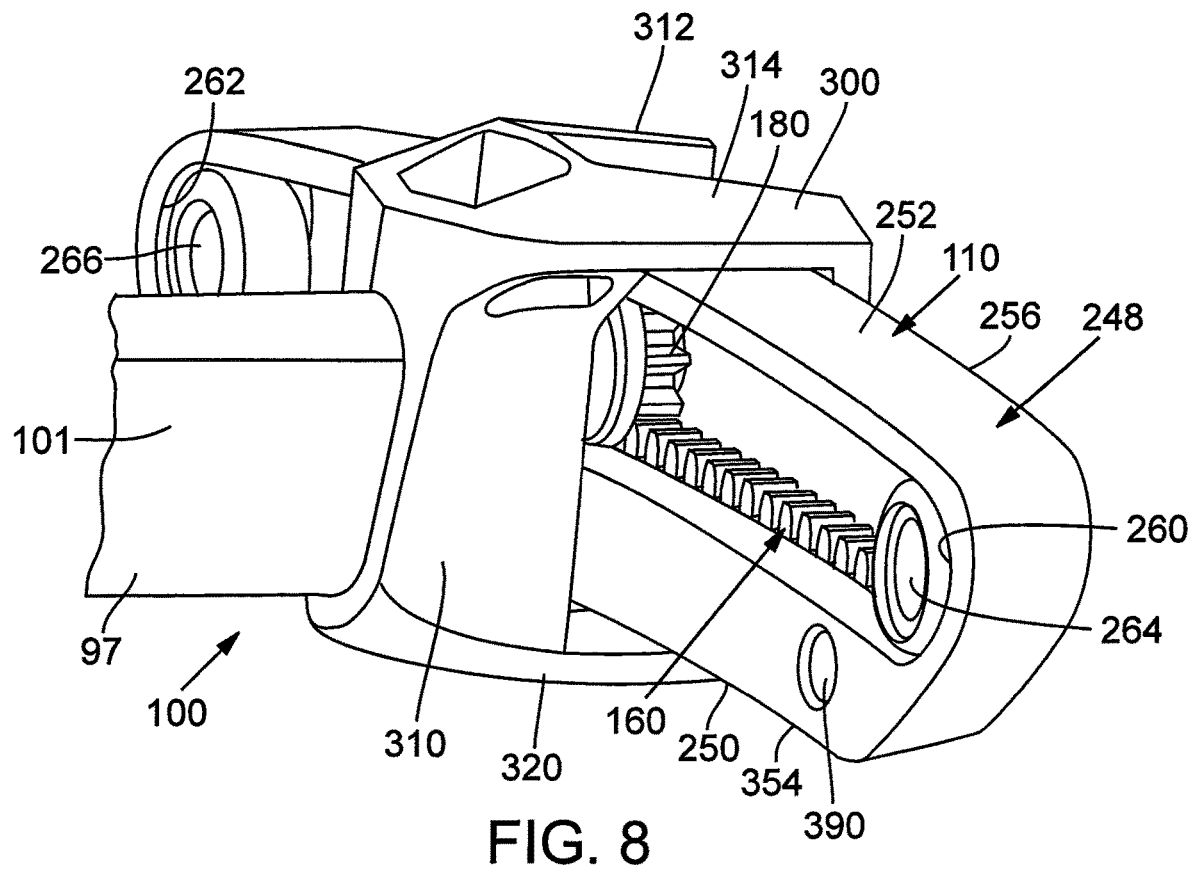
FIG. 8 is a rear perspective view of a portion of the embodiment shown in FIG. 7.
Figure 10:
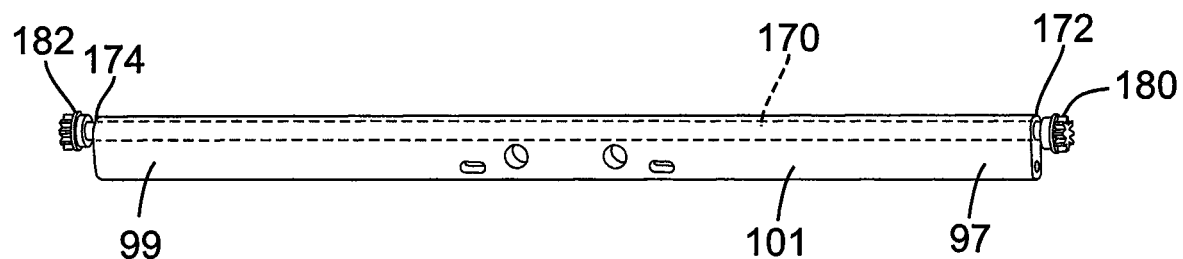
FIG. 10 is a side view, partially broken away, of an exemplary form of cross member.
Figure 11:
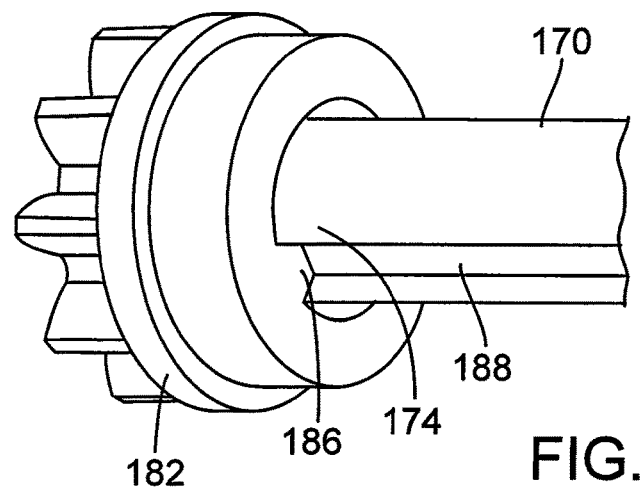
FIG. 11 illustrates a gear coupled to a rod that can be included in the seat recline.
Figure 12:
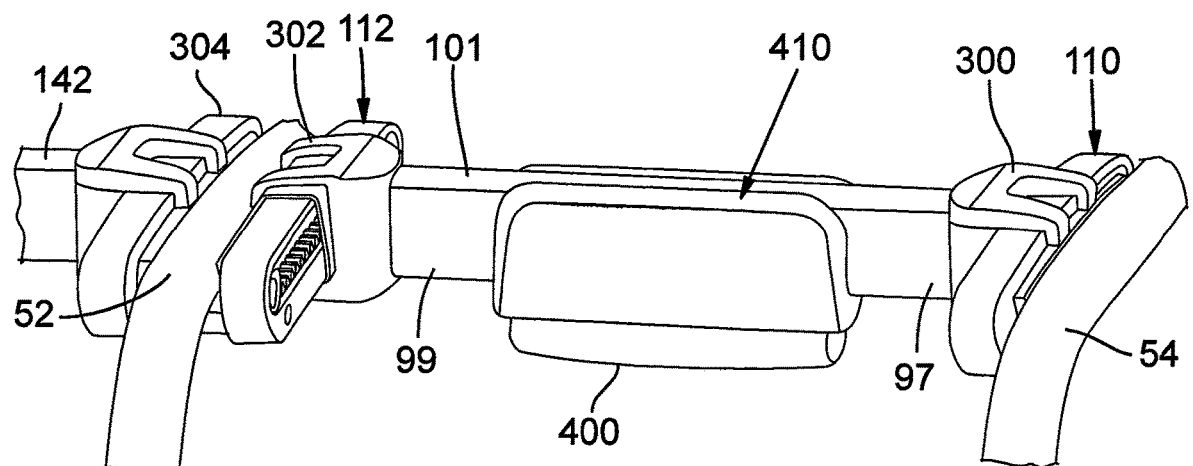
FIG. 12 illustrates a form of actuator comprising a housing and actuator member coupled to the housing and used to selectively locking the cross member to the supports at a desired position and to unlock the cross member from the supports to permit movement of the cross member to a different position.

A rod 170 is shown if FIG. 10 (see also FIGS. 5 and 11) with first and second rod ends 172, 174. The rod is desirably rotatably coupled to the cross member 101. Bearings, such as bearing sleeves (not shown can be positioned internally within the cross member, or at the ends of the cross member to rotatably support the rod). A first gear 180 is coupled to the first rod end 172 and is positioned in engagement with the first gear rack 160 (FIG. 8). A second gear 182 is coupled to the second rod end 174 and is positioned in engagement with the second gear rack 162. The first and second gears 180, 182 are desirably coupled to the respective rod ends 172 so as to rotate together when the rod is rotated. For example, as shown in FIG. 11 for gear 182, the gear 182 has a projecting key 186 that is inserted in a groove 188 in the rod 170 such that gear 182 rotates with the rotation of the rod 170. The gear 180 can be coupled to the rod end 172 in the same manner. Therefore, the gears 180, 182 do not rotate relative to one another and rotate together as the rod 170 is rotated to thereby travel without slipping along the respective engaged gear racks 110, 112. With this construction, upon movement of the cross member 101 forwardly or rearwardly along the first and second top frame members 51, 45, such as by a user pushing or pulling on the cross member 101, from a first of a plurality of positions to another of the plurality of positions, the rod 170 rotates and the first and second gears travel together along the respective first and second gear racks.

Figure 17:
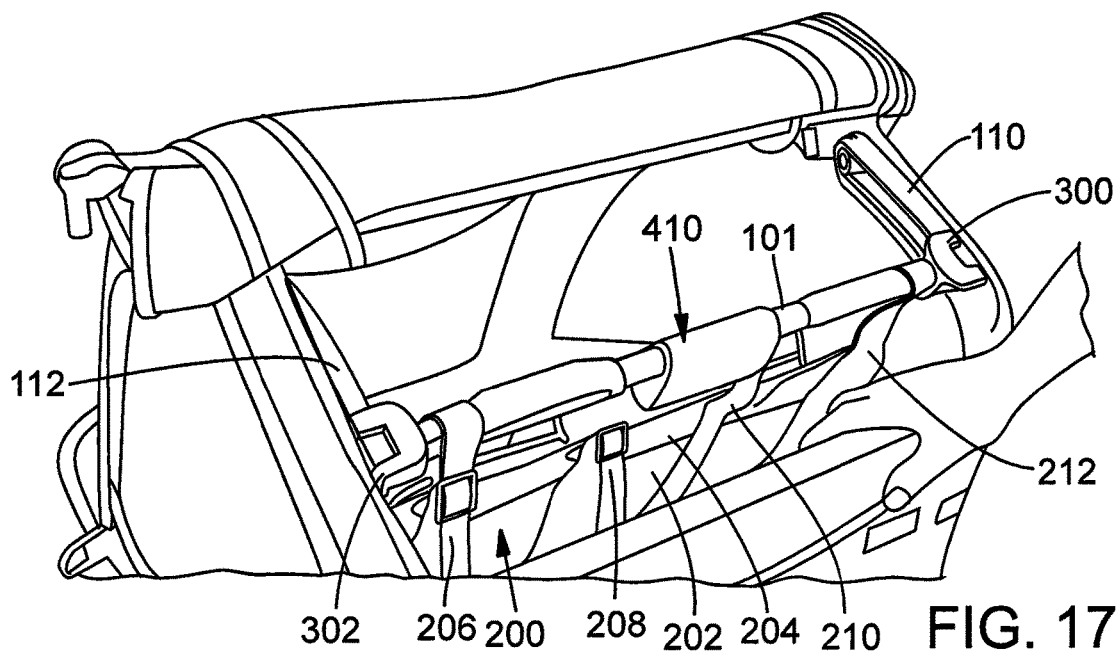
FIG. 17 illustrates an embodiment of a seat recline for adjusting the inclination or recline position of the upper seat portion of a single seat.

Referring for to FIG. 17, a seat 200 is shown with an upper seat end portion 202, such as an upper end portion 204 of the upper seat portion, coupled to the cross member 101.

In this example, spaced apart straps 206-212 are connected to the upper seat portion and to the cross member to thereby couple the upper seat portion to the cross member. With this construction, movement of the cross member 101 from a first of the plurality of positions to a second of the plurality of positions moves the upper end portion 204 of the seat in the direction of movement of the cross member and changes the inclination of the upper portion of the seat.

Figure 18:
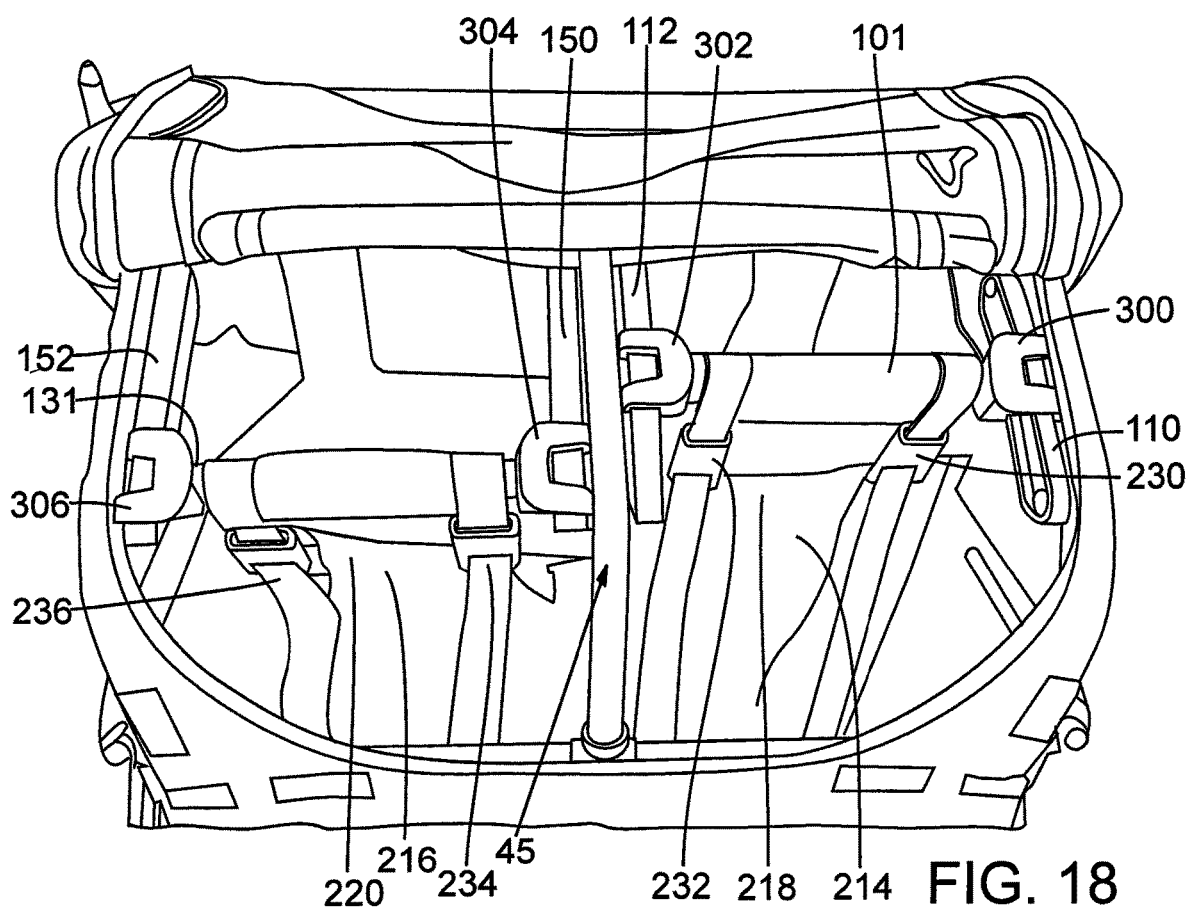
FIG. 18 illustrates an embodiment of a seat recline for adjusting the inclination or recline position of two side by side upper seat portions.

Referring to FIG. 18, in the dual seat recline adjustment embodiment, the seat comprises first and second separated upper portions 214, 216 with respective seat upper end portions 218, 220. In this example, the upper end portion 218 of upper seat section 214 is coupled to cross member 101 and the upper end portion 220 of upper seat section 216 is coupled to cross member 131. In this example, spaced apart straps 230, 232 are connected to the upper seat portion 218 and to the first cross member 101 to thereby couple the seat member 214 to the first cross member. Also, in this example, spaced apart straps 234, 236 are connected to the upper seat portion 220 and to the second cross member 131 to thereby couple the upper seat portion 220 to the second cross member. With this construction, movement of the cross member 101 from a first of the plurality of positions to a second of the plurality of positions moves the upper end portion 218 of the seat back or upper seat portion 214 in the direction of movement of the cross member 101 and changes the inclination of the upper portion 214 of the seat. In addition, with this construction, movement of the cross member 131 from a first of the plurality of positions to a second of the plurality of positions moves the upper end portion 220 of the seat back or upper seat portion 216 in the direction of movement of the cross member 131 and changes the inclination of the upper portion 216 of the seat. As shown in FIG. 18 by the different positions of the cross members 101 and 131, the cross members desirably can be moved independently of one another to various recline positions.

It should be noted that different approaches can be used to couple the upper seat portions to the cross members. For example, the upper edge of the seat portions can be inserted into a groove in the cross member and retained by an elongated bead pressed into the groove. The upper seat portion can be sewn, stapled, fastened by fasteners such as screws, looped around and stitched, adhesively secured or otherwise coupled to the associated cross member.

The upper seat portions can be comprised of durable sheet material such as fabric, with canvas and rip stop nylon being examples. Other examples include fiber reinforced polymer materials. The lower end of the seat back can be fastened to the rear portion of a buttock supporting portion of the seat or to a lower portion of the frame. The seat can also comprise a padded seat back fastened or leaning against the movable seat back portion.

A latch, such as explained below in connection with FIGS. 12-16, is desirably coupled to the cross member 101 and movable into a first latching position engaging at least one of the first and second supports 110, 112, and more desirably both of the first and second supports. The latch is also movable to a second un-latched position disengaged from said one or both of said first and second supports. In the first latching position, the latch retains the cross member 101 in a selected one of the plurality of positions.

With reference to FIGS. 5-8, each support can be of the same construction. Therefore, only support 110 is described with reference to these FIGS. The support 110, which can comprise the first support comprises a first support body 248. The first support body 248 and the first support 110 comprises a first support inner wall 250, a first support top or top surface 252, a first support bottom or bottom surface 254, and a first support outer wall 256. In addition, the first rack 160 can be recessed into the first inner wall 250 to shield the gear 170 and rack and gear teeth when engaged. The gear rack 160 can be closed at its respective ends 260, 262. In addition, bumpers or cushions 264, 266, such as of rubber, at the respective ends of the gear rack 160 can serve as stops to limit the travelling movement of the gear 170 in forward and reverse directions along the gear rack. The second, third and fourth supports 12, 150 and 152 and their associated respective gear racks 162-164 can have the same features. The respective inner walls of the supports with the gear racks formed therein or mounted thereto face one another at opposite ends of the cross member.

Respective couplers can couple the respective end portions of the cross members to their associated supports. With reference to FIG. 3, a first coupler 300 couples the first end portion 97 of cross member 101 to the associated first support 110 and a second coupler 302 couples the second end portion 99 of cross member 101 to the associated support 112. With reference to FIG. 4, in addition to the first and second couplers 300, 302, a third coupler 304 couples the first end portion 142 of cross member 131 to the associated third support 150 and a fourth coupler 306 couples the second end portion 144 of cross member 131 to the associated fourth support 152. These couplers can take any form that accomplishes a connection to the associated supports in a manner that allows the gears to travel along the associated gear racks as the cross members move forwardly and rearwardly. Desirably, the couplers are slidably coupled to their associated supports.

Figure 9:
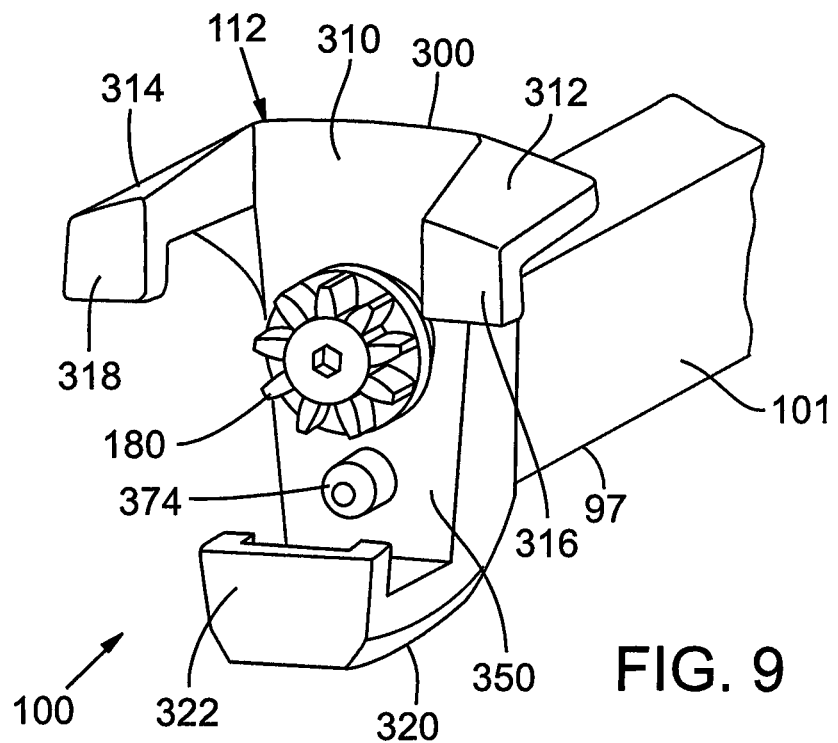
FIG. 9 is an end view of one form of a coupler that can be used to couple an end portion of the cross member to the support.

The couplers can, for example, be identical. Therefore, an exemplary form of a coupler 300 is described below with reference to FIGS. 6-9, and as best seen in FIG. 9. The first support coupler 300 can comprise a first coupler body 310 coupled to the first end portion 97 of the cross member 101. The first coupler 300 can also comprise at least one first upper coupler projection 312, (and more desirably first and second spaced apart upper projections 312, 314), that projects outwardly from the first coupler body 310 and that is positioned to overhang and slide against the first support top surface 252. The first support coupler 300 in this example also comprises a first flange portion 316 spaced from the first coupler body 310 and projecting downwardly from the first upper coupler projection 312 (the projection 314 can also have a downwardly projecting flange 318). The first flange portion 316 is positioned to slide against the first support outer wall 256. In addition, the first support coupler 300 can comprise at least one first lower coupler projection 320 that projects outwardly from the first coupler body 310 and that is positioned to underlie and slide against the first support bottom surface 254. In addition, the first support coupler can comprise at least one first lower coupler projection 320 that can comprise at least one second flange portion 322 spaced from the first coupler body 310 and projecting upwardly from the first lower coupler projection 320. The second flange portion 322 can be positioned to slide against the first support outer wall 256. Again, the second, and third and fourth couplers if included, can have these features. It should be noted that the term slide against includes sliding against intervening components positioned between two surfaces, although more desirably the term slide against refers to direct or abutting contact between two surfaces.

The first coupler 300 can also be considered as having an upper jaw that engages the upper portion of the support and a lower jaw that engages the lower portion of the support. The flanges in effect constitute a form of teeth on the respective jaws.

Figure 6:
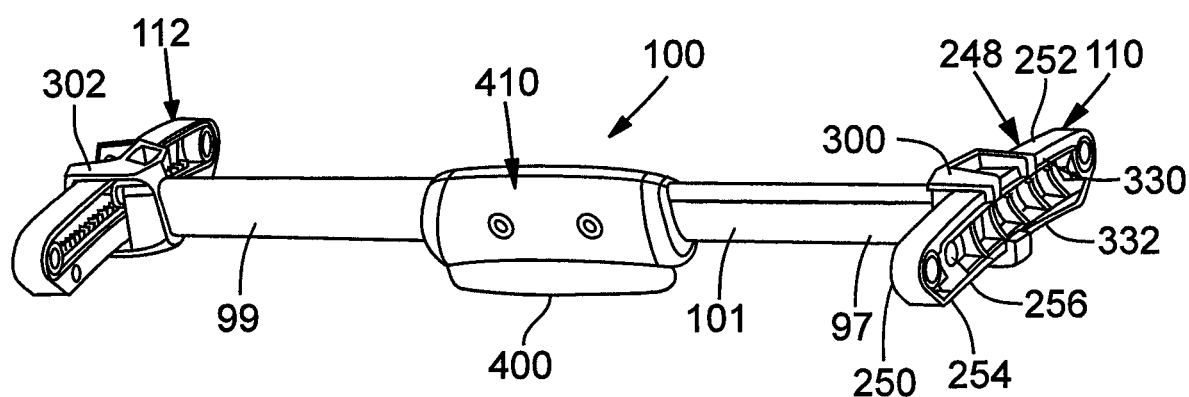
FIG. 6 is a rear perspective view of an embodiment of a seat recline.

With reference to FIG. 6, the first support outer wall 256 can comprise a first upper groove 330 extending in a lengthwise direction at least partially along the length of the first support 110. In addition, the first outer wall 256 can comprise a second lower groove 332 extending in a lengthwise direction at least partially along the length of the first support. The first upper groove can be slidably engaged by the at least one first flange portion 316 (or by flange portions 316 and 318 if both are included). The first lower groove can be slidably engaged by the at least one lower flange portion 322. The grooves 330, 332 provide a space top frame member 51 and the engaged flange portions as shown in FIG. 3 for coupler 302.

With reference to FIG. 9, the first gear 180 is shown supported by the first rod end at a position outwardly from the outer surface 350 of the first coupler body 310 and at an elevation lower than the at first upper coupler projections 314, 312 and at an elevation higher than the first lower coupler projection 320. The projections assist in preventing inadvertent access to the gear 180 and gear teeth being engaged by the gear as the gear rotates.

As previously mentioned the seat reclines 100 (and 130 if included) desirably include a latch to selectively retain the cross member(s) in a selected position of a plurality of positions. The latch can be a movable stop or clamp positioned along the length of one or more of the supports. Alternatively, the latch can be a pin that is movable manually or by an actuator from the coupler into one of a plurality of openings in the support, such as three such openings with each opening corresponding to a desired seat incline position.

Figure 7:
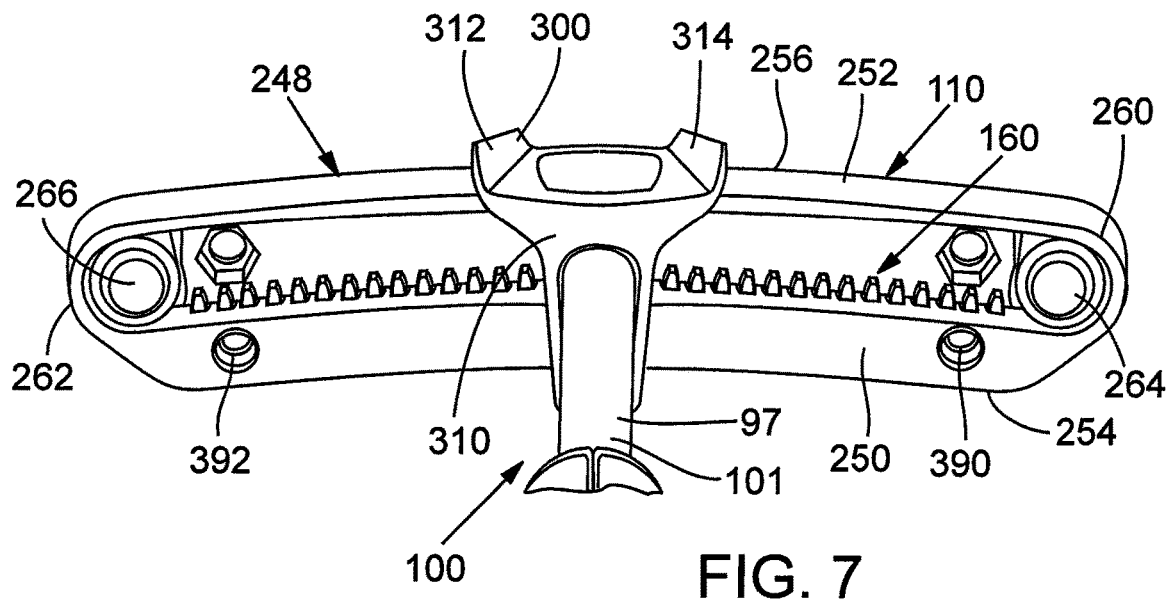
FIG. 7 is a side view of and end portion of one embodiment of a seat recline showing a support with an inwardly facing rack, an end portion of a cross member and a form of coupler for coupling the end portion of the cross member to the support.

One desirable form of a latch will be described with reference to FIGS. 5, 7, 9 and 12-16. The exemplary latch can comprise a first latching rod 370 (FIG. 5) with an first actuator engaging end 372 (See, e.g. FIG. 13) and a first locking end 374 (FIGS. 5 and 9) and a second latching rod 380 (FIG. 13) with an second actuator engaging end 382 and a second locking end 384. The supports each comprise a respective locking end receiving opening at each of the plurality of positions. In FIG. 7, two of such openings are indicated at 390, 392 with a third such opening being positioned between openings 390, 392, such as halfway in between such openings, and hidden by the coupler 300 in FIG. 7. A latching rod actuator such as comprising an actuator member 400 is coupled to the first and second actuator engaging ends 372, 382 of the first and second latching rods 370, 380. The latching rod actuator member 400 is operable to move the first locking end 374 (FIGS. 5 and 9) to a first latching position in which the first locking end 374 is received in the locking end receiving opening of the first support 110 at a selected one of the plurality of positions (e.g. corresponding to the position of openings 390, 392 in FIG. 7) to retain the first end portion 97 of the cross member 101 at the selected one of the plurality of positions. The latching rod actuator 400 is also operable to move the second locking end 384 to the first latching position in which the second locking end 384 is received in the locking end receiving opening of the second support 112 at the selected one of the plurality of positions to retain the second end portion 99 of the cross member 101 at the said one of the plurality of positions. In addition, the actuator member 400 is also operable to move the first locking end 374 to the second un-latched position out of the locking end receiving opening of the first support 110 at said one of the plurality of locations and to move the second locking end 384 to the second un-latched position out of the locking end receiving opening of the second support 112 at said one of the plurality of locations. When the locking ends are in the second un-latched positions, the cross member 101 is movable to another of the selected plurality of positions. The recline 130 can have the same latch as described above for cross member 101.

In addition, the first and second locking ends 374, 384 can be positioned to extend through the respective first and second coupler bodies at a location below the respective first and second gears when the first and second locking pins are in the first latching position. This is shown in FIG. 9 for locking end 374, coupler body 310 and gear 180. As a result, the coupler body 300 reinforces the locking end 374 and in this example, surrounds the locking end.

Figure 13:
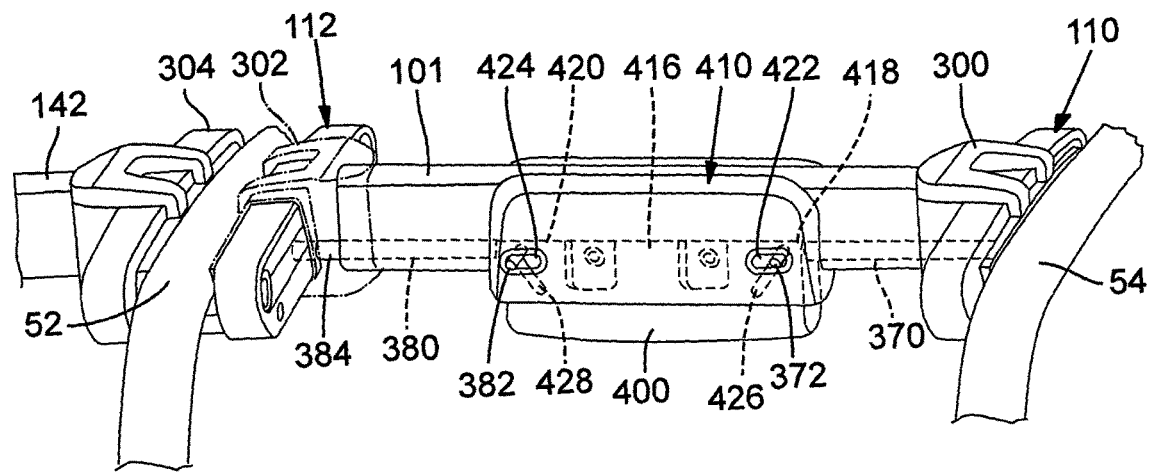
FIGS. 13-16 illustrate the operation of the actuator member of the form depicted in these FIGS. to shift latching rods from latched to unlatched positions and vice versa.
Figure 14:
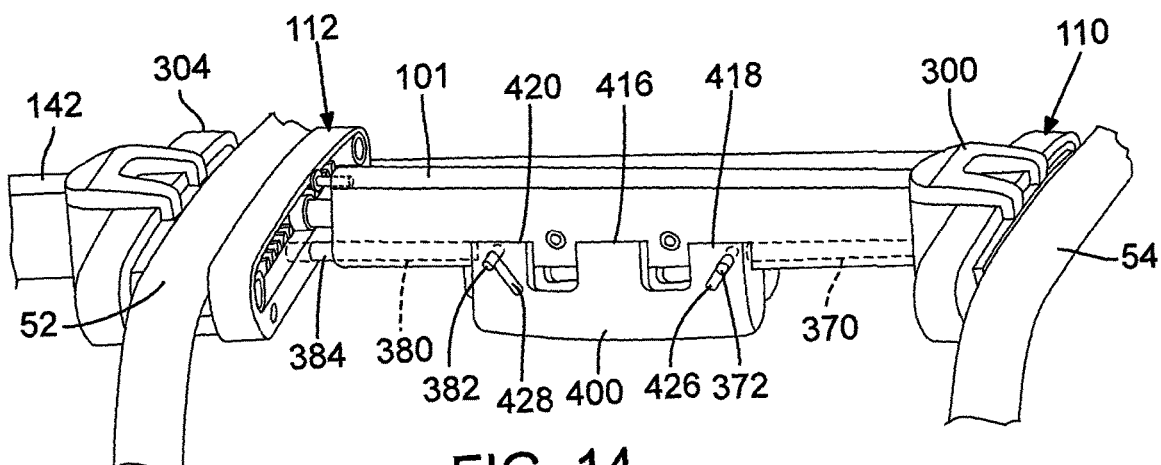
Figure 15:
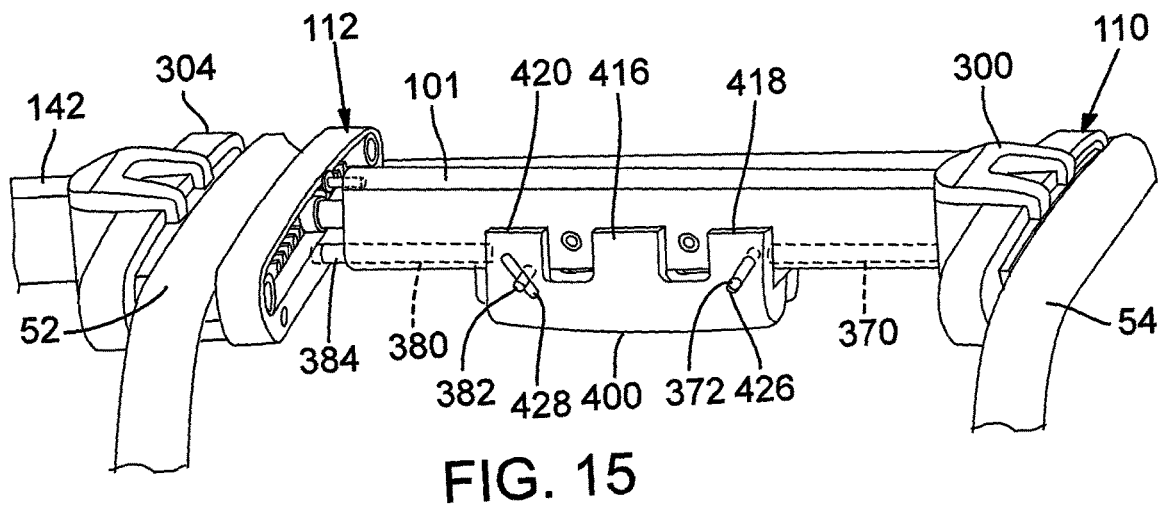
Figure 16:
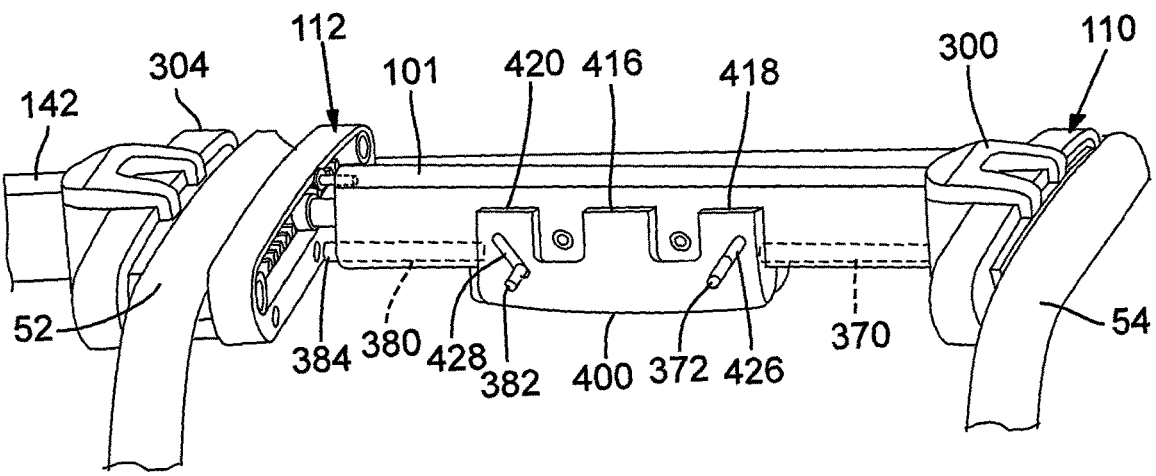

With further reference to FIGS. 6 and 13-16, latching rod actuator can comprise an actuator housing 410 coupled to the cross member 101, such as by bolts or other fasteners, at location between the first and second end portions 97, 99 of the cross member 101. In addition, the housing 410 in this example extends downwardly from the cross member 101. In addition, the actuator further comprises a sliding actuator member 400 slidably coupled to the actuator housing 410 for moving between first and second actuator member positions. In FIG. 13, the actuator member is shown with a central flange 416 and first and second side flanges 418, 420 slidably received in respective channels of the housing 410. In addition, the illustrated actuator housing 410 or cross member comprises first and second actuator slots 422, 424 that are oriented to extend in a direction parallel to the gear supporting rod 170, such as horizontal. In addition, the illustrated actuator 400 can comprise and third and fourth actuator slots 426, 428 (best seen in FIGS. 14-16). The third actuator slot 426 has an upper slot end portion aligned with a portion of the first actuator slot 422 and a lower slot end portion positioned downwardly and inwardly from the upper slot end portion. Also, the fourth actuator slot 428 has an upper slot end portion aligned with a portion of the second actuator slot 424 and a lower slot end portion positioned downwardly and inwardly from the upper slot end portion. The first actuator engaging end 372 of the first latching rod 370 can comprise a first slot engaging portion, such as a pin extending perpendicularly outwardly from the first latching rod 370. Also, the second actuator engaging end 382 of the second latching rod 380 can comprise a second slot engaging portion, such as a pin extending perpendicularly outwardly from the second latching rod 380. In this embodiment, the first actuator engaging end 372 passes through the first and third slots 422, 426 and the second actuator engaging end 382 of the second latching rod 380 passes through the second and fourth slots 424, 428. With this construction, sliding the actuator member 400 relative to the housing 410 in an upward direction (as shown by the progressive positions in FIGS. 14-16, in which the support coupler 302 has been omitted for convenience) simultaneously moves the actuator engaging ends 372, 382 of the first and second latching rods 370, 380 inwardly in the slots 422, 424 to move the locking ends 374, 384 of the first and second latching rods to their unlatched position. If a second cross member 131 is included, it can be provided with a latching actuator as described above. One or more springs (not shown) can be provided; and coupled to the actuator housing and to the actuator to bias the actuator to its latching position; which is its downward position in this example.

Figure 19:
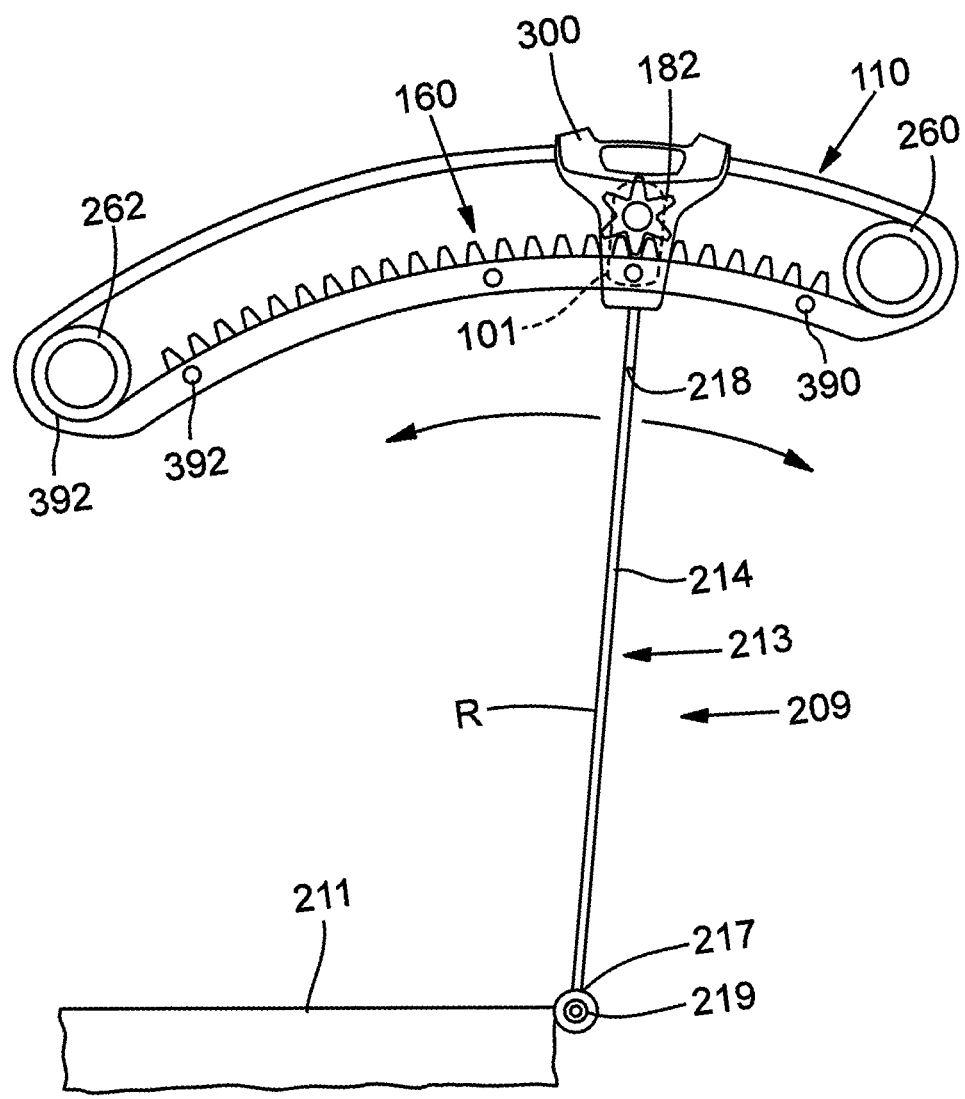
FIG. 19 schematically illustrates a seat with a seat back portion in an embodiment in which the rack of a support is shown to have an arced or concave curvature (exaggerated in FIG. 19) about a lower seat back pivot axis.

With reference to FIGS. 17, 18 and 19; and with specific reference to FIG. 19, an exemplary bicycle trailer seat 209 is shown with a lower seat portion 211, which can be a cushioned lower seat, and a seat back portion 213. The seat back portion comprises an upper portion 214 with an upper end portion 218 shown coupled to the cross member 101. The second seat of FIG. 18, if included, can be of the same construction with a second seat back portion that is desirably separated from the first seat back portion such that the two seat back portions can be independently inclined to different degrees. The illustrated first seat back portion 213 has a lower end 217 that is pivotal about a transverse lower first seat back pivot axis 219. The term pivotal includes bendable about the pivot axis. For example, the lower portion of the seat back can be sewn too, hinged to, or otherwise connected to the seat portion, such as to a rear portion thereof or to a portion of the frame. The seat back is desirably of a flexible sheet material that can bend relative to the lower seat or frame. The first rack 160 is desirably arced, such as concave, when viewed from the lower seat back pivot axis. The second rack 162 can be of the same construction. Desirably the first rack 160 (and also the second rack 162) is arced with a radius R from the transverse axis so that distance between the first rack and the lower first seat back pivot axis is constant and the same as the distance between the second rack and the lower first seat back pivot axis. With this construction, as the first cross member moves forwardly and rearwardly along the first and second supports 110, 112 to various positions, the distance between the first cross member and the lower first seat back pivot remains constant and thereby the tension on the first seat upper portion remains constant. The distance can deviate from being constant as some variations in seat tension as the cross member moves along the supports, although less desirable, can be allowed, such as the radius R being approximately constant.

Desirably the top frame portions 52, 54 and the first and second supports 110, 112 are also arced to match the arc of the racks 160, 162. In addition, the racks 164, 166 can be arced or concave in the same manner as shown in FIG. 19. Also, the third and fourth supports and 150, 152 and top members 45 and 134 can all be arced to match the arc of the third and fourth racks 164, 166.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A bicycle trailer comprising:
    a frame defining a seating area and first and second spaced apart top frame members, the first and second top frame members being positioned at an elevation that is higher than the seating area;
    a first support comprising a first rack coupled to the first top frame member and a second support comprising a second rack coupled to the second top frame member, the first and second racks facing one another;
    a cross member comprising a first and second end portions, the first end portion being coupled to the first support and the second end portion being coupled to the second support, the cross member being movable forwardly and rearwardly along the first and second supports between a plurality of positions;
    a rod with first and second rod ends, the rod being rotatably coupled to the cross member; a first gear coupled to the first rod end in engagement with the first rack, a second gear coupled to the second rod end and positioned in engagement with the second rack, the first and second gears being coupled to the respective rod ends for rotating together when the rod is rotated, whereby upon movement of the cross member from a first of the plurality of positions to another of the plurality of positions, the rod rotates and the first and second gears travel together along the respective first and second racks;
    a seat comprising a seat back portion with an upper end portion coupled to the cross member, whereby upon movement of the cross member from a first of the plurality of positions to a second of the plurality of positions, the upper end portion of the seat moves in the direction of movement of the cross member and changes the inclination of the seat back portion of the seat; and
    a latch coupled to the cross member and movable into a first latching position engaging at least one of the first and second supports and coupling the cross member to said one of the first and second supports and movable to a second un-latched position disengaged from said one of said first and second supports, wherein in the first latching position, the latch retains the cross member in a selected one of the plurality of positions.

2. A bicycle trailer according to claim 1 wherein the first support comprises a first support inner wall, a first support top, a first support bottom, and a first support outer wall; wherein the second support comprises a second support inner wall facing the first support inner wall, a second support top surface, a second support bottom surface and a second support outer wall, and wherein the first rack is recessed into the first support inner wall and the second rack is recessed into the second support inner wall.

3. A bicycle trailer according to claim 1 comprising a first support coupler mounted to the first end portion of the cross member and slidably coupled to the first support and a second support coupler mounted to the second end portion of the cross member and slidably coupled to the second support.

4. A bicycle trailer according to claim 3 wherein the first support, coupler comprises a first coupler body coupled to the first end portion of the cross member and at least one first upper coupler projection that projects outwardly from the first coupler body and that is positioned to overhang and slide against the first support top surface, the first support coupler also comprising a first flange portion spaced from the first coupler body and projecting downwardly from the first upper coupler projection, the first flange portion being positioned to slide against the first support outer wall, wherein the first support coupler comprises at least one first lower coupler projection that projects outwardly from the first coupler body and that is positioned to underlie and slide against the first support bottom surface, wherein the first support coupler comprises at least one first lower coupler projection comprising at least one second flange portion spaced from the first coupler body and projecting upwardly from the first lower coupler projection, the second flange portion being positioned to slide against the first support outer wall; and
    wherein the second support coupler comprises a second coupler body coupled to the second end portion of the cross member and at least one second upper coupler projection that projects outwardly from the second coupler body and that is positioned to overhang and slide against the second support top surface, the second support coupler also comprising a third flange portion spaced from the second coupler body and projecting downwardly from the second upper coupler projection, the third flange portion being positioned to slide against the second support outer wall, wherein the second support coupler comprises at least one second lower coupler projection that projects outwardly from the second coupler body and that is positioned to underlie and slide against the second support bottom surface, wherein the second support coupler comprises at least one second lower coupler projection comprising at least one fourth flange portion spaced from the second coupler body and projecting upwardly from the second lower coupler projection, the second flange portion being positioned to slide against the second support outer wall.

5. A bicycle trailer according to claim 4 wherein the first support outer wall comprises a first upper groove slidably engaged by the at least one first flange portion and a first lower groove slidably engaged by the at least one second flange portion; and wherein the second support outer wall comprises a second upper groove slidably engaged by the at least one third flange portion and a second lower groove slidably engaged by the at least one fourth flange portion.

6. A bicycle trailer according to claim 5 wherein the first gear is supported by the first rod end at a position outwardly from the first coupler body and at an elevation lower than the first upper coupler projection and at an elevation higher than the first lower coupler projection; and wherein the second gear is supported by the second rod end at a position outwardly from the second coupler body and at an elevation lower than the second upper coupler projection and at an elevation higher than the second lower coupler projection.

7. A bicycle trailer according to claim 5 wherein there are first and second of the first upper projections that are spaced apart from one another, each of the first and second of the first upper projections comprising a respective downwardly projecting first flange, and wherein there are first and second of the second upper projections that are spaced apart from one another, each of the first and second of the second upper projections comprising a respective downwardly projecting third flange.

8. A bicycle trailer according to claim 1 wherein the latch comprises a first latching rod with a first actuator engaging end and a first locking end and a second latching rod with a second actuator engaging end and a second locking end, the first and second supports each comprising a respective locking end receiving opening at each of the plurality of positions, a latching rod actuator coupled to the first and second actuator engaging ends of the first and second latching rods, the latching rod actuator being operable to move the first locking end to the first latching position in which the first locking end is received in the locking end receiving opening of the first support at a selected one of the plurality of positions to retain the first end portion of the cross member at the selected one of the plurality of positions, the latching rod actuator being operable to move the second locking end to the first latching position in which the second locking end is received in the locking end receiving opening of the second support at the selected one of the plurality of positions to retain the second end portion of the cross member at the said one of the plurality of positions, the actuator also being operable to move the first locking end to the second un-latched position out of the locking end receiving opening of the first support at said one of the plurality of locations and to move the second locking end to the second un-latched position out of the locking end receiving opening of the second support at said one of the plurality of locations, whereby in the second un-latched positions, the cross member is movable to another of the selected plurality of positions.

9. A bicycle trailer according to claim 5 wherein the latch comprises a first latching rod with an first actuator engaging end and a first locking end and a second latching rod with an second actuator engaging end and a second locking end, the first and second supports each comprising a respective locking end receiving opening at each of the plurality of positions, a latching rod actuator coupled to the first and second actuator engaging ends of the first and second latching rods, the latching rod actuator being operable to move the first locking end to the first latching position in which the first locking end is received in the locking end receiving opening of the first support at a selected one of the plurality of positions to retain the first end portion of the cross member at the selected one of the plurality of positions, the latching rod actuator being operable to move the second locking end to the first latching position in which the second locking end is received in the locking end receiving opening of the second support at the selected one of the plurality of positions to retain the second end portion of the cross member at the said one of the plurality of positions, the actuator also being operable to move the first locking end to the second un-latched position out of the locking end receiving opening of the first support at said one of the plurality of locations and to move the second locking end to the second un-latched position out of the locking end receiving opening of the second support at said one of the plurality of locations, whereby in the second un-latched positions, the cross member is movable to another of the selected plurality of positions; and wherein the first and second locking ends extend through the respective first and second coupler bodies at a location below the respective first and second gears when the first and second locking pins are in the first latching position.

10. A bicycle trailer according to claim 9 wherein the actuator comprises an actuator housing coupled to the cross member at location between the first and second end portions of the cross member and extending downwardly from the cross member, the actuator further comprising a sliding actuator member slidably coupled to the actuator housing for moving between first and second actuator member positions, the actuator housing or the cross member comprising first and second actuator slots, the first and second actuator slots being oriented to extend in a direction parallel to the cross member, the sliding actuator member comprising third and fourth actuator slots, the third actuator slot having an upper slot end portion aligned with a portion of the first actuator slot and a lower slot end portion positioned downwardly and inwardly from the upper slot end portion, the fourth actuator slot having an upper slot end portion aligned with a portion of the second actuator slot and a lower slot end portion positioned downwardly and inwardly from the upper slot end portion, the first actuator engaging end of the first latching rod comprising a first slot engaging portion passing through the first and third slots and the first actuator engaging end of the second latching rod comprising a second slot engaging portion passing through the second and fourth slots, wherein sliding the sliding actuator member relative to the housing in an upward direction simultaneously moves the first and second slot engaging portions and the first and second latching rods inwardly parallel to the cross member and moves the locking ends of the first and second latching rods to their unlatched position.

11. A bicycle trailer according to claim 1:
wherein the cross member of claim 1 comprises a first cross member, the rod of claim 1 comprises a first rod, the seat of claim 1 comprises a first seat, the upper seat portion of claim 1 comprises a first upper seat portion, the seat back portion of claim 1 comprises a first seat back portion, and the latch of claim 1 comprises a first latch;

and wherein the bicycle trailer further comprises:
a third top frame member spaced from the first and second top frame members and where the second top frame member is positioned between the first and third top frame members, the third top frame member being positioned at an elevation that is higher than the seating area;
a third support comprising a third rack coupled to the first top frame member and a fourth support comprising a fourth rack coupled to the third top frame member, the third and fourth racks facing one another;
a second cross member comprising a first and second end portions, the first end portion of the second cross member being movably coupled to the third support and the second end portion of the second cross member being movably coupled to the fourth support, the second cross member being movable forwardly and rearwardly along the third and fourth supports between a plurality of positions;
a second rod with first and second rod ends, the second rod being rotatably coupled to the second cross member; a third gear coupled to the first rod end of the second rod in engagement with the third rack, a fourth gear coupled to the second rod end of the second rod and positioned in engagement with the fourth rack, the third and fourth gears being coupled to the respective rod ends of the second rod for rotating together when the second rod is rotated, whereby upon moving the second cross member from a first of the plurality of positions to another of the plurality of positions, the second rod rotates and the third and fourth gears travel together along the respective third and fourth racks;
a second seat, the second seat comprising a second seat back portion and a second upper end portion, the second seat back portion being separated from the first seat back portion, wherein upon moving the first cross member from a first of the plurality of positions to a second of the plurality of positions the first upper end portion of the first seat moves in the direction of movement of the first cross member and changes the inclination of the first seat back portion, and wherein upon moving the second cross member from a first of the plurality of positions to a second of the plurality of positions the second upper end portion of the second seat moves in the direction of movement of the second cross member and changes the inclination of the second seat back portion;
a second latch coupled to the second cross member and movable into a first latching position engaging at least one of the third and fourth supports and coupling the second cross member to said one of the third and fourth supports and movable to a second un-latched position disengaged from said one of said third and fourth supports, wherein in the first latching position, the second latch retains the second cross member in a selected one of the plurality of positions.

12. A bicycle trailer according to claim 11 wherein the first and second cross members are movable relative to one another to independently adjust the inclination of the first and second upper seat portions.

13. A bicycle trailer according to claim 12 wherein the first and second latches are independently operable.

14. A bicycle trailer according to claim 11 wherein the first seat back portion has a lower end that is pivotal about a transverse lower first seat back pivot axis, and wherein the first and second racks are arced to maintain a constant distance from the first rack to the lower first seat back pivot axis and from the second rack to the lower first seat back pivot axis, whereby as the first cross member moves forwardly and rearwardly along the first and second supports, the distance between the first cross member and the lower first seat back pivot remains constant and thereby the tension on the first seat upper portion remains constant; and
wherein the second seat back portion has a lower end that is pivotal about a transverse lower second seat back pivot axis, and wherein the third and fourth racks are arced to maintain a constant distance from the third rack to the lower second seat back pivot axis and from the fourth rack to the lower second seat back pivot axis, whereby as the second cross member moves forwardly and rearwardly along the third and fourth supports, the distance between the second cross member and the lower second seat back pivot remains constant and thereby the tension on the second seat upper portion remains constant.

15. A bicycle trailer according to claim 14 wherein the first and second top frame members, and the first and second supports are arced to match the arc of the first and second racks; and wherein the second and third top frame members, and the second and third supports are arced to match the arc of the third and fourth racks.

16. A bicycle trailer according to claim 1 wherein the upper seat portion has a lower end that is pivotal about a transverse lower seat back pivot axis, and wherein the first and second racks are concave when viewed from the lower seat back pivot axis.

17. A bicycle trailer according to claim 1 wherein the upper seat portion has a lower end that is pivotal about a transverse lower seat back pivot axis, wherein the first rack is arced to maintain a constant distance from the first rack to the lower seat back pivot axis, and wherein the second rack is arced to maintain a constant distance from the second rack to the lower seat back pivot axis, whereby as the cross member moves forwardly and rearwardly along the first and second supports, the distance between the cross member and the lower seat back pivot remains constant and thereby the tension on the upper seat portion remains constant.

18. A bicycle trailer according to claim 17 wherein the first and second top frame members, and the first and second supports are arced to match the arc of the first and second racks.

19. A bicycle trailer comprising:
a frame defining a seating area, a bottom frame portion, a front frame portion comprising first and second upwardly extending front frame members, a rear frame portion comprising first and second upwardly extending rear frame members, and first and second spaced apart top frame members positioned higher than the seating area, the first and second top frame members being parallel to one another and extending forwardly of the rear frame portion;
a seat recline assembly coupled to first and second top frame members;
the seat recline assembly comprising a first support comprising a first support body, the first support body comprising a first support body interior side wall and a first support body, exterior side wall, a first body rear end and a first body front end, a first body top surface and a first body bottom surface, wherein the first support body exterior side wall is coupled to the first top frame member and a first rack coupled to or formed as a part of the first body interior side wall, and the first rack extending in a direction from the first body rear end toward the first body front end;

the seat recline assembly comprising a second support comprising a second support body, the second support body comprising a second support body interior side wall and a second support body exterior side wall, a second body rear end and a second body front end, a second body top surface and a second body bottom surface, wherein the second support body exterior side wall is coupled to the second top frame member and a second rack is coupled or formed as a part of the second body interior side wall, the second rack extending in a direction from the second body rear end toward the second body front end, and wherein the second rack is parallel to the first rack;

a seat supporting cross member comprising first and second ends and extending longitudinally at least partially between the first and second top frame members;

a first body engaging coupler mounted to the first end of the seat supporting cross member and a second body engaging coupler mounted to the second end of the seat supporting cross member;

the first body engaging coupler comprising a first upper jaw portion slidably engaging the first body top surface, a first lower jaw portion slidably engaging the first body bottom surface and a first wall extending between the first upper jaw portion and the first lower jaw portion;

the second body engaging coupler comprising a second upper jaw portion slidably engaging the second body top surface, a second lower jaw portion slidably engaging the second body bottom surface and a second wall extending between the second upper jaw portion and the second lower jaw portion;

a gear supporting rod extending through the seat supporting cross member and comprising first and second rod end portions, the gear supporting rod being rotatable relative to the seat supporting cross member, a first gear coupled to the first rod end portion and positioned between the first upper jaw portion and the first lower jaw portion and in engagement with the first rack, a second gear coupled to the second rod end portion and positioned between the second upper jaw portion and the second lower jaw portion and in engagement with the second rack, the first and second gears not being rotatable relative to the gear supporting rod, whereby the cross member is movable forwardly and rearwardly along the first and second supports between a plurality of positions with the first and second gears rotating together with the rotation of the gear supporting rod and in engagement with the respective first and second racks and with the first and second gears traveling respectively along the first and second racks without sliding as the cross member is moved between the plurality of positions;

a seat comprising a lower end portion coupled to the front trailer frame portion and an upper end portion coupled to the seat supporting cross member, whereby movement of the cross member between the plurality of positions moves the upper end portion of the seat in the direction of movement of the cross member and changes the inclination of the seat.

20. A bicycle trailer comprising:

a frame means for supporting a seat in a seating area;

first support means supported by the frame means and comprising a first gear receiving rack supported at a location at an elevation that is higher than the seating area;

second support means supported by the frame means and comprising a second gear receiving rack supported at a location at an elevation that is higher than the seating area, the first and second racks facing one another;

a cross member comprising a first and second end portions;

first gear means carried by the cross member for engaging and traveling along the first rack;

second gear means carried by the cross member for engaging and traveling along the second rack, the cross member being movable forwardly and rearwardly relative to the first and second supports between a plurality of positions with the first and second gear means traveling respectively along the first and second racks;

first coupling means for coupling the first end portion of the cross member to the first support and second coupling means for coupling the second end portion of the cross member to the second support;

a seat comprising an upper end portion coupled to the cross member, whereby upon moving the cross member from a first of the plurality of positions to a second of the plurality of positions the upper end portion of the seat moves in the direction of movement of the cross member and changes the inclination of the upper portion of the seat; and a latch means for selectively latching the cross member against movement from a selected one of the plurality of positions.

* * * * *

UNITED STATES PATENT AND TRADEMARK OFFICE
CERTIFICATE OF CORRECTION

PATENT NO. : 11,148,560 B1
APPLICATION NO. : 16/392428
DATED : October 19, 2021
INVENTOR(S) : Aamodt et al.

Page 1 of 1

It is certified that error appears in the above-identified patent and that said Letters Patent is hereby corrected as shown below:

In the Claims

Column 18, Line 42, Claim 4, "support, coupler" should read --support coupler--.

Signed and Sealed this
Fourth Day of January, 2022

Drew Hirshfeld
*Performing the Functions and Duties of the
Under Secretary of Commerce for Intellectual Property and
Director of the United States Patent and Trademark Office*